US011352046B2

US 11,352,046 B2

(12) United States Patent
Smith et al.

(10) Patent No.: US 11,352,046 B2
(45) Date of Patent: Jun. 7, 2022

(54) LEVER ASSEMBLY FOR A STEERING COLUMN OF A VEHICLE

(71) Applicant: KA Group AG, Zürich (CH)

(72) Inventors: Timothy Clayton Smith, The Woodlands, TX (US); Christopher Glenn Turney, The Woodlands, TX (US); Kenichi Miyagi, Conroe, TX (US)

(73) Assignee: KA Group AG, Zürich (CH)

( * ) Notice: Subject to any disclaimer, the term of this patent is extended or adjusted under 35 U.S.C. 154(b) by 365 days.

(21) Appl. No.: 16/623,658

(22) PCT Filed: Jul. 12, 2018

(86) PCT No.: PCT/IB2018/055170
§ 371 (c)(1),
(2) Date: Dec. 17, 2019

(87) PCT Pub. No.: WO2019/012484
PCT Pub. Date: Jan. 17, 2019

(65) Prior Publication Data
US 2020/0198683 A1    Jun. 25, 2020

Related U.S. Application Data

(60) Provisional application No. 62/531,768, filed on Jul. 12, 2017.

(51) Int. Cl.
*H01H 25/00* (2006.01)
*B62D 1/14* (2006.01)
(Continued)

(52) U.S. Cl.
CPC ............... *B62D 1/14* (2013.01); *B62D 1/16* (2013.01); *F16H 25/08* (2013.01)

(58) Field of Classification Search
CPC .. B62D 1/14; B62D 1/16; F16H 25/08; B60Q 1/425
(Continued)

(56) References Cited

U.S. PATENT DOCUMENTS

| 5,575,177 A | * | 11/1996 | Poleschuk | B60Q 1/425 74/484 R |
| 5,742,014 A | * | 4/1998 | Schwartz | B60Q 1/1469 200/61.54 |

(Continued)

FOREIGN PATENT DOCUMENTS

| DE | 35 10 714 A1 | 9/1986 |
| DE | 3510714 A1 | 9/1986 |

(Continued)

OTHER PUBLICATIONS

International Search Report for Application No. PCT/IB2018/055170 dated Nov. 6, 2018, 6 pages.

(Continued)

*Primary Examiner* — Toan C To
(74) *Attorney, Agent, or Firm* — Howard & Howard Attorneys PLLC

(57) ABSTRACT

A lever assembly (20) has a lever (24) mounted to a lever housing (22), a plunger (26), an auto-return housing (28) pivotable relative to the lever housing (22), a trigger mechanism (30) movable relative to the auto-return housing (28), and a yoke member (32) pivotable relative to the auto-return housing (22) independent of the auto-return housing. The trigger mechanism (30) is movable to an extended position in response to movement of the plunger (26) for engaging a cam element (12) of the steering column (10) for auto-return of the lever to a rest position. The yoke member (32) interacts with the plunger (26) when the plunger (26) pivots with the lever (24) to cause the yoke (32) to pivot toward an engaged position, and the yoke (32) interacts with the trigger (Continued)

mechanism (30) when the yoke (32) is pivoted to move the trigger mechanism (30) toward the extended position.

25 Claims, 16 Drawing Sheets

(51) Int. Cl.
*B62D 1/16* (2006.01)
*F16H 25/08* (2006.01)

(58) Field of Classification Search
USPC .............................................. 200/61.27, 61.3
See application file for complete search history.

(56) References Cited

U.S. PATENT DOCUMENTS

| | | | | |
|---|---|---|---|---|
| 5,949,040 | A * | 9/1999 | Hayakawa | B60Q 1/425 200/61.34 |
| 6,194,676 | B1 | 2/2001 | Takahashi et al. | |
| 6,441,735 | B1 * | 8/2002 | Marko | E05B 45/12 70/432 |
| 6,624,364 | B2 * | 9/2003 | Liburdi | B60Q 1/1469 200/61.27 |
| 6,677,543 | B2 | 1/2004 | Takahashi et al. | |
| 6,727,448 | B2 * | 4/2004 | Takahashi | B60Q 1/1461 200/332 |
| 7,453,048 | B2 | 11/2008 | Cordier et al. | |
| 9,651,982 | B2 | 5/2017 | Lipfert et al. | |
| 10,100,919 | B1 * | 10/2018 | Turney | F16H 59/0278 |
| 2006/0185463 | A1 * | 8/2006 | Takahashi | H01H 25/04 74/504 |
| 2008/0202900 | A1 * | 8/2008 | Sugino | B60Q 1/425 200/61.34 |

FOREIGN PATENT DOCUMENTS

| | | |
|---|---|---|
| DE | 42 26 506 A1 | 2/1994 |
| DE | 4226506 A1 | 2/1994 |
| DE | 199 04 620 B4 | 12/2005 |
| DE | 19904620 B4 | 12/2005 |
| DE | 10 2011 122 445 A1 | 6/2013 |
| DE | 102011122445 A1 | 6/2013 |
| EP | 1 772 312 A1 | 4/2007 |
| EP | 1772312 A1 | 4/2007 |
| EP | 2756991 A1 | 7/2014 |
| JP | 2017-100663 A | 6/2017 |
| JP | 2017100663 A | 6/2017 |

OTHER PUBLICATIONS

English language abstract for DE 35 10 714 A1 extracted from espacenet.com database on Mar. 14, 2020, 1 page.
English language abstract for DE 42 26 506 A1 extracted from espacenet.com database on Mar. 14, 2020, 1 page.
English language abstract for DE 199 04 620 B4 extracted from espacenet.com database on Mar. 14, 2020, 1 page.
Machine-assisted English language abstract for DE 10 2011 122 445 A1 extracted from espacenet.com database on Mar. 14, 2020, 3 pages.
English language abstract for EP 1 772 312 A1 extracted from espacenet.com database on Mar. 14, 2020, 1 page.
English language abstract for JP 2017-100663 A extracted from espacenet.com database on Mar. 14, 2020, 1 page.

* cited by examiner

LEVER ASSEMBLY FOR A STEERING COLUMN OF A VEHICLE

CROSS-REFERENCE TO RELATED APPLICATIONS

The subject application is the national filing of International Application No. PCT/IB2018/055170, filed on Jul. 12, 2018, which claims priority to and all the benefits of U.S. Provisional Application No. 62/531,768, filed on Jul. 12, 2017 the contents of which are incorporated herein by reference in their entirety.

FIELD OF THE DISCLOSURE

The present disclosure relates generally to a lever assembly for a steering column of a vehicle.

BACKGROUND

Lever assemblies are often coupled to a steering column of a vehicle and are used to actuate one or more operational functions of the vehicle, such as to actuate turn signal lamps, high beam headlights, windshield wipers, rear window wipers, etc. The vehicle has a lever assembly coupled to the left side of the steering column typically used for actuating turn signal lamps and high beam headlights, and a lever assembly coupled to the right side of the steering column typically used for actuating windshield and rear window wipers. For actuating the turn signal lamps, for example, the left-side lever assembly is pivoted upwards (or clockwise) from a rest position to an actuated position to actuate a right turn signal lamp, and is pivoted downwards (or counter-clockwise) from a rest position to another actuated position to actuate a left turn signal lamp. The lever assembly is automatically and/or manually returned to the rest position when the steering column is rotated in a direction opposite the turn and back to the rest position.

SUMMARY

A lever assembly for a steering column of a vehicle is disclosed. The steering column has a cam element. The lever assembly comprises a lever housing defining a cavity and having first and second lever housing ends, a lever pivotally mounted to the lever housing and pivotable between a rest position and at least one actuated position with the lever extending from the first lever housing end, a plunger coupled to the lever and pivotable with the lever when the lever moves to the at least one actuated position with the plunger extending into the cavity biased toward the second lever housing end, an auto-return housing pivotally mounted to the lever housing and having first and second auto-return housing ends with the auto-return housing pivotable relative to the lever housing between a home position and at least one pivot position with the auto-return housing biased toward the home position, a trigger mechanism coupled to and movable relative to the auto-return housing between a retracted position and an extended position with the trigger mechanism biased toward the retracted position and movable to the extended position in response to the pivotal movement of the plunger when the lever pivots to the at least one actuated position for engaging the cam element of the steering column to provide an auto-return of the lever back to the rest position, and a yoke member coupled to the auto-return housing between the trigger mechanism and the plunger and pivotable relative to the auto-return housing between a neutral position and an engaged position independent of the pivoting of the auto-return housing between the home position and the pivot position, with the yoke member configured to interact with the plunger when the plunger pivots with the lever to cause the yoke member to pivot toward the engaged position and the yoke member is configured to interact with the trigger mechanism when the yoke member is pivoted to move the trigger mechanism toward the extended position.

A method of operating a lever assembly and a steering column of a vehicle is also disclosed. The steering column has a cam element. The lever assembly comprises a lever housing having first and second lever housing ends, a lever, a plunger coupled to the lever, an auto-return housing, a trigger mechanism coupled to the auto-return housing, and a yoke member coupled to the auto-return housing between the trigger mechanism and the plunger. The method comprises the steps of: pivoting the lever relative to the lever housing from a rest position to an actuated position; simultaneously pivoting the plunger with the lever to engage the plunger with the yoke member; pivoting the engaged yoke member into an engaged position to engage the trigger mechanism; moving the engaged trigger mechanism relative to the auto-return housing into an extended position abutting the cam element; turning the steering column of the vehicle in a first direction; engaging the trigger mechanism with the cam element of the steering column during the step of turning the steering column in the first direction; pivoting the auto-return housing from a home position to a first pivot position during the engagement of the cam element with the trigger mechanism; turning the steering column in a second direction opposite the first direction; capturing the trigger mechanism with the cam element during the step of turning the steering column in the second direction; pivoting the auto-return housing to a second pivot position during the capturing of the trigger mechanism; and automatically returning the lever back to the rest position.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale. Additionally, certain features of the lever assembly, the steering column, and/or the cam element may be generically or schematically illustrated in the figures.

DETAILED DESCRIPTION

Referring now to the figures, wherein like numerals indicate corresponding parts throughout the several views, embodiments of a lever assembly 20 are shown throughout the figures and described in detail below. The lever assembly 20 is coupled to a steering column 10 of a vehicle, such as a passenger car, truck, or other transportation vehicle. The lever assembly 20 may be coupled to the steering column 10 at any suitable location to allow for easy access by an operator, such as a driver, of the vehicle. In an embodiment, the lever assembly 20 is directly attached or mounted to a housing of the steering column 10. In an alternative embodiment, the lever assembly 20 could be attached or mounted in other locations inside a passenger compartment of the vehicle that is accessible by the vehicle operator.

In the embodiments described below, the lever assembly 20 is configured to actuate turn signal lamps of the vehicle, such as a right turn signal lamp(s) (where the signal lamp(s) on the right side of the vehicle flashes when actuated) and a left turn signal lamp(s) (where the signal lamp(s) on the left side of the vehicle flashes when actuated). In these embodiments, the lever assembly 20 is described and shown as being coupled to a left side of the steering column 10. It should be appreciated that the lever assembly 20 could be configured to actuate other operational functions of the vehicle, such as to actuate headlights, high beams, windshield and/or rear window wipers, etc., and the lever assembly 20 could be mounted to any suitable component along on the steering column 10.

Figure 9:
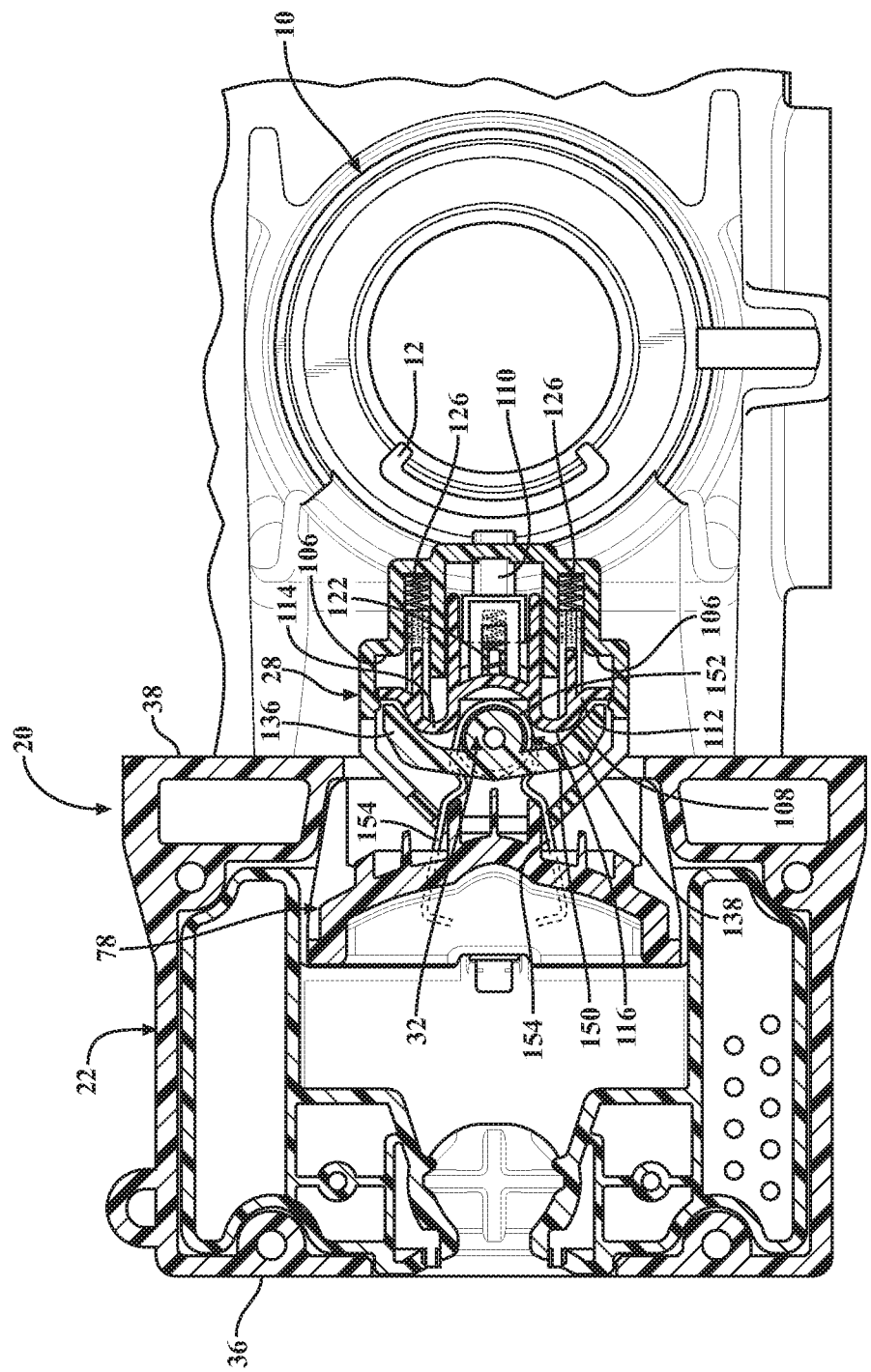
FIG. 9 is a cross-sectional view of a system including the lever assembly and a steering column with the lever of the lever assembly in the rest position and the steering column in a central position.

The steering column 10 supports a steering wheel usable by the vehicle operator to control the vehicle. The steering column 10 connects the steering wheel to a steering mechanism of the vehicle. As shown in FIGS. 9, 11, 13, 15, and 17, the steering column 10 has a cam element 12. The cam element 12 is directly mounted or attached to the steering column 10. The cam element 12 rotates with the steering column 10 as the steering column 10 is rotated by the steering wheel to the right (clockwise) and to the left (counter-clockwise). With the steering column 10 in a central position, as shown in FIG. 9 for example, the cam element 12 is mounted to a left side of the steering column 10. The cam element 12 interacts with the lever assembly 20 to provide an automatic return (or auto-return) of a lever 24 of the lever assembly 20 back into a rest position once the lever 24 has been actuated. This is described in detail below. It should be appreciated that the cam element 12 could be mounted anywhere on the steering column 10 as long as the cam element 12 can suitably interact with the lever assembly 20.

Details of the lever assembly 20 are described below with reference to FIGS. 1-17. The lever assembly 20 has a lever housing 22. The lever housing 22 is mounted to the steering column 10 by any suitable means, such as with fasteners or the like. The lever housing 22 is configured to at least partially house and/or support individual components of the lever assembly 20, including but not limited to a lever 24, a plunger 26, an auto-return housing 28, a trigger mechanism 30, and a yoke member 32. The lever housing 22 may have any suitable configuration. As shown at least in FIGS. 2 and 3, the lever housing 22 defines a cavity 34 and has first 36 and second 38 lever housing ends. The lever housing 22 further defines a first opening 40 through the first lever housing end 36 and a second opening 42 through the second lever housing end 38. Each of the first 40 and second 42 openings provides access to the cavity 34.

Figure 3:
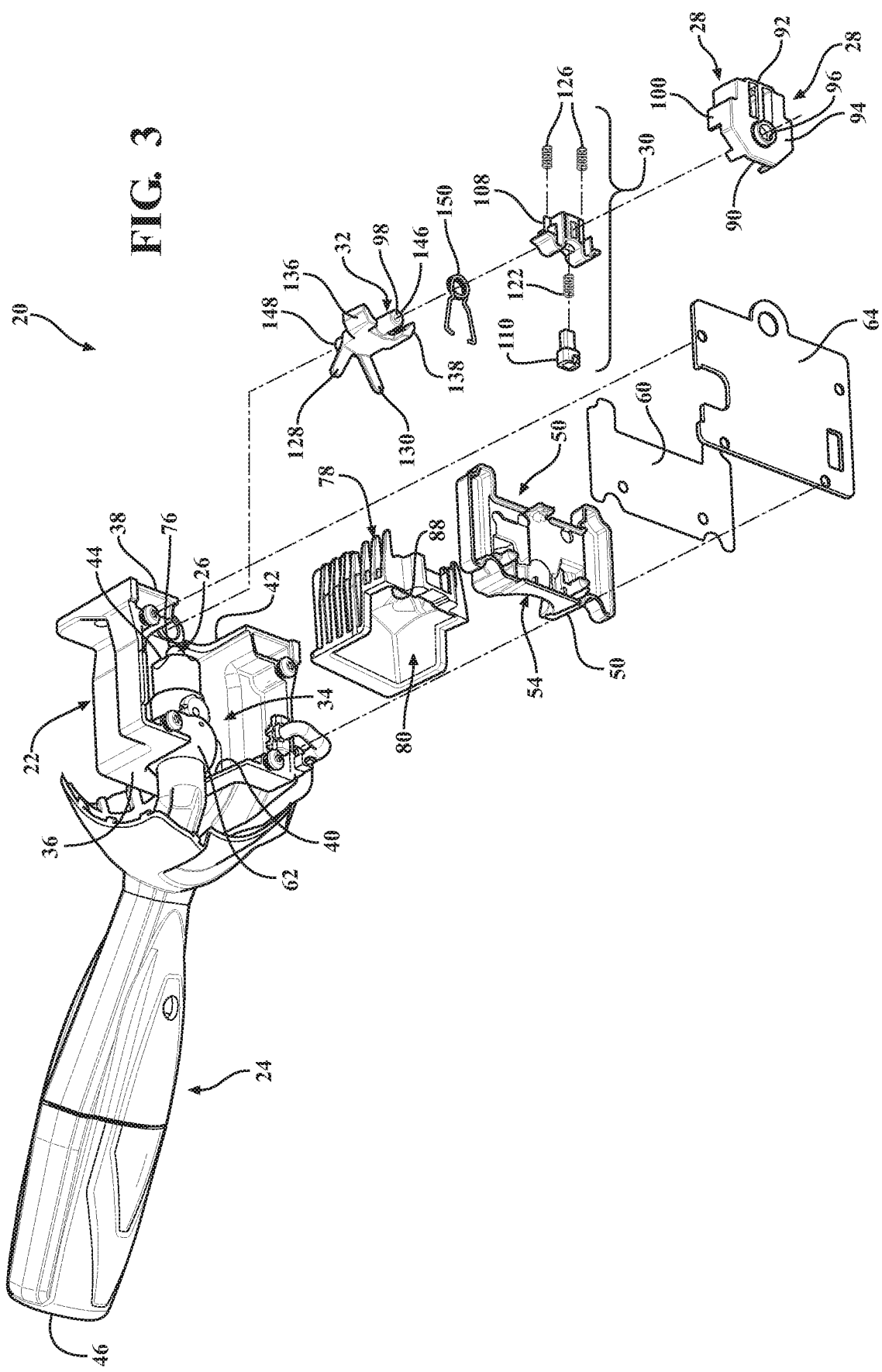
FIG. 3 is a partial exploded perspective view of the lever assembly of FIG. 1.

The lever assembly 20 further includes the lever 24 extending from the first lever housing end 36. The lever 24 has a first lever end 44 and a second lever end 46 spaced from the first lever end 44. The first lever end 44 is disposed in the cavity 34 and supported by the lever housing 22. The first lever end 44 is also supported by a detent plate 78. As best shown in FIG. 3, the lever 24 extends from the first lever end 44 disposed inside the cavity 34, through the first opening 40 of the lever housing 22, and to the second lever end 46. A portion of the lever 24 including the second lever end 46 is exposed within the passenger compartment of the vehicle so that the lever 24 is accessible to the vehicle operator or driver. The exposed portion of the lever 24 may have any suitable length, width, and/or configuration.

Figure 1:
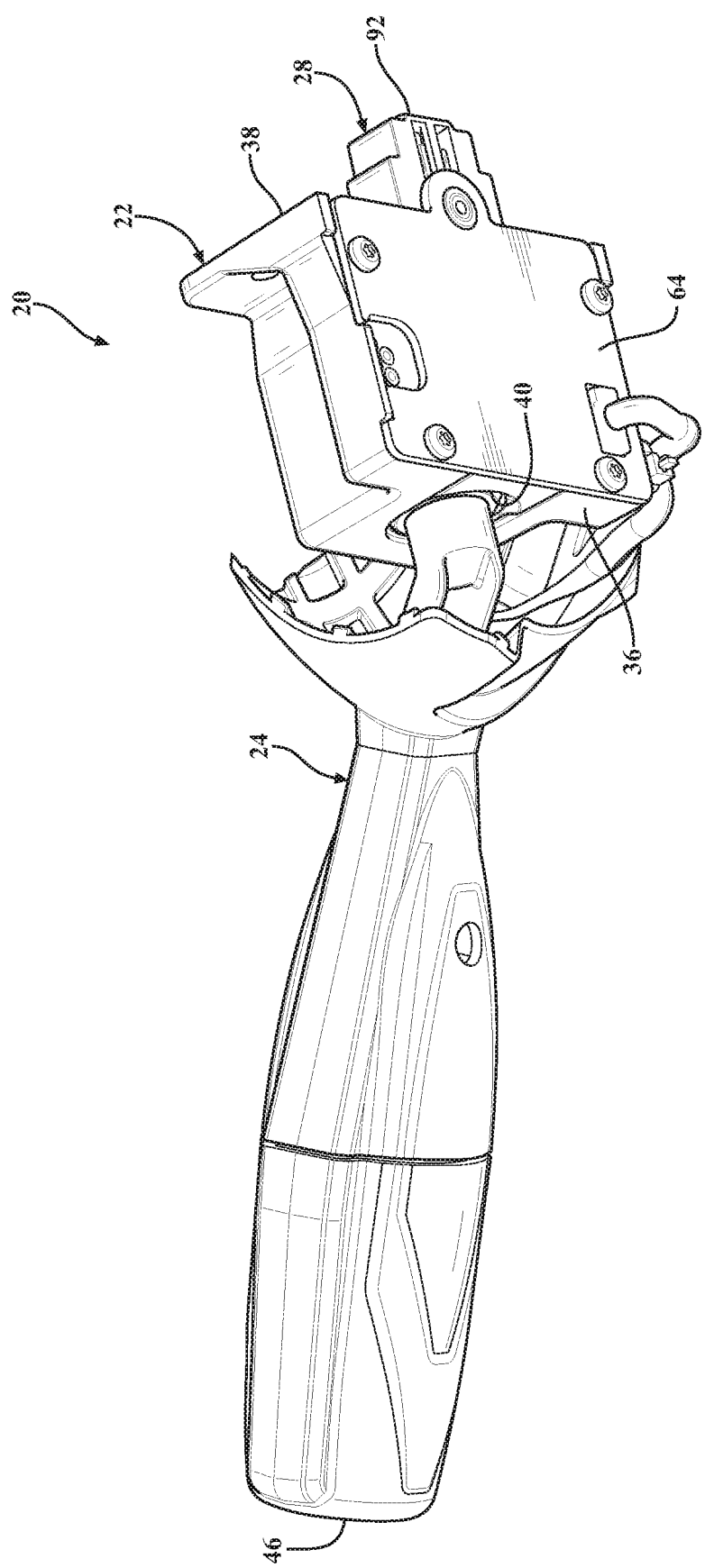
FIG. 1 is a perspective view of an embodiment of a lever assembly for a steering column of a vehicle.
Figure 2:
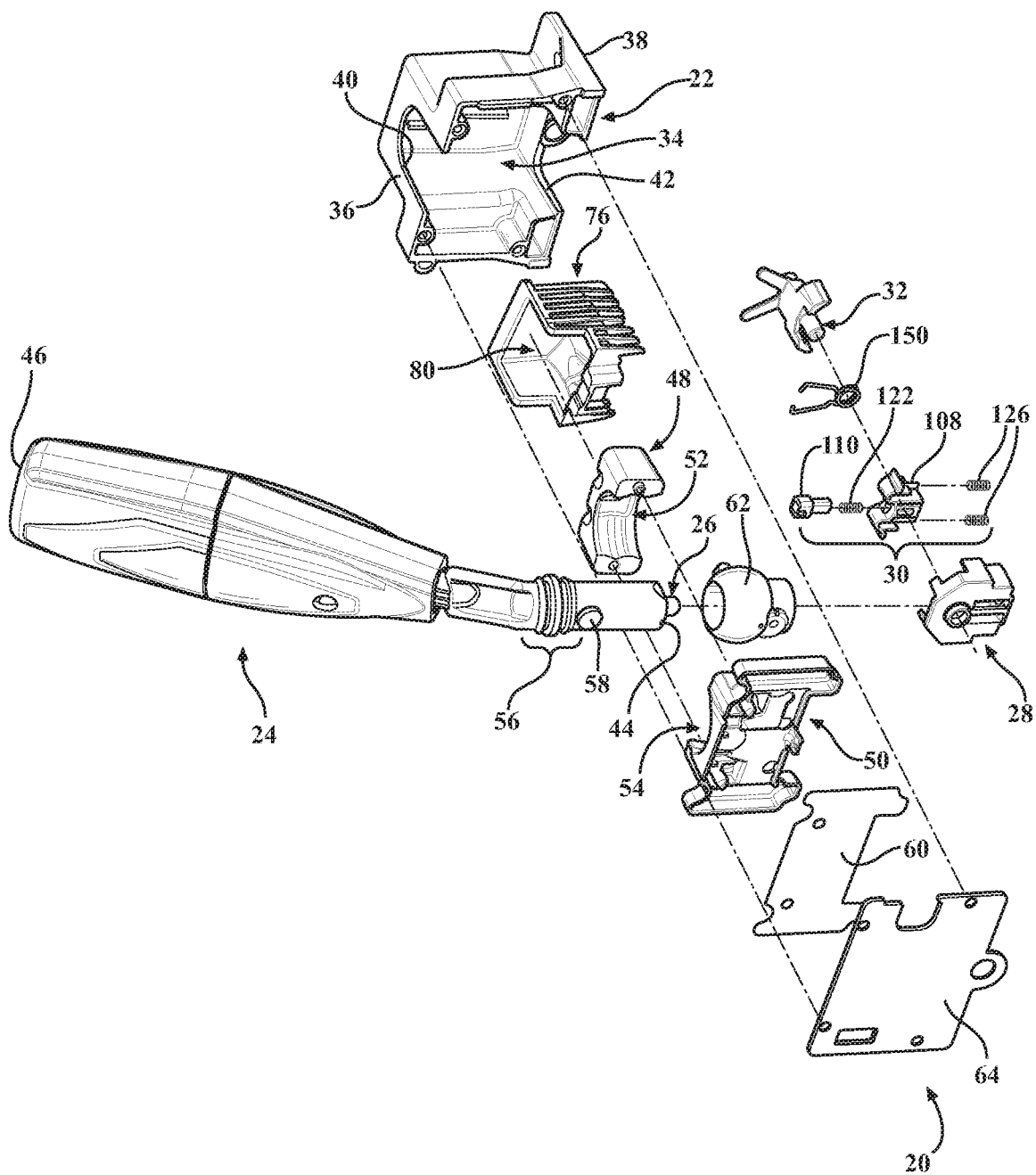
FIG. 2 is an exploded perspective view of the lever assembly of FIG. 1.
Figure 4:
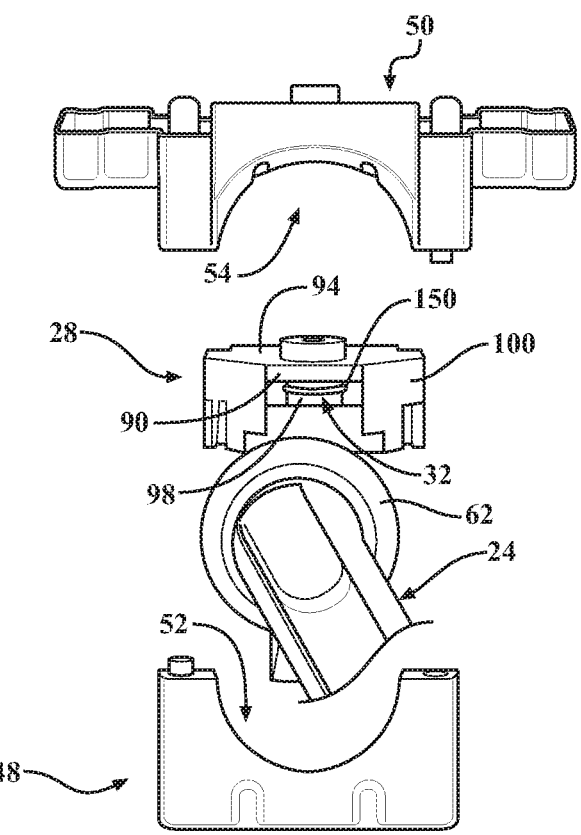
FIG. 4 is a partial exploded perspective view of a portion of the lever assembly of FIG. 1.
Figure 5:
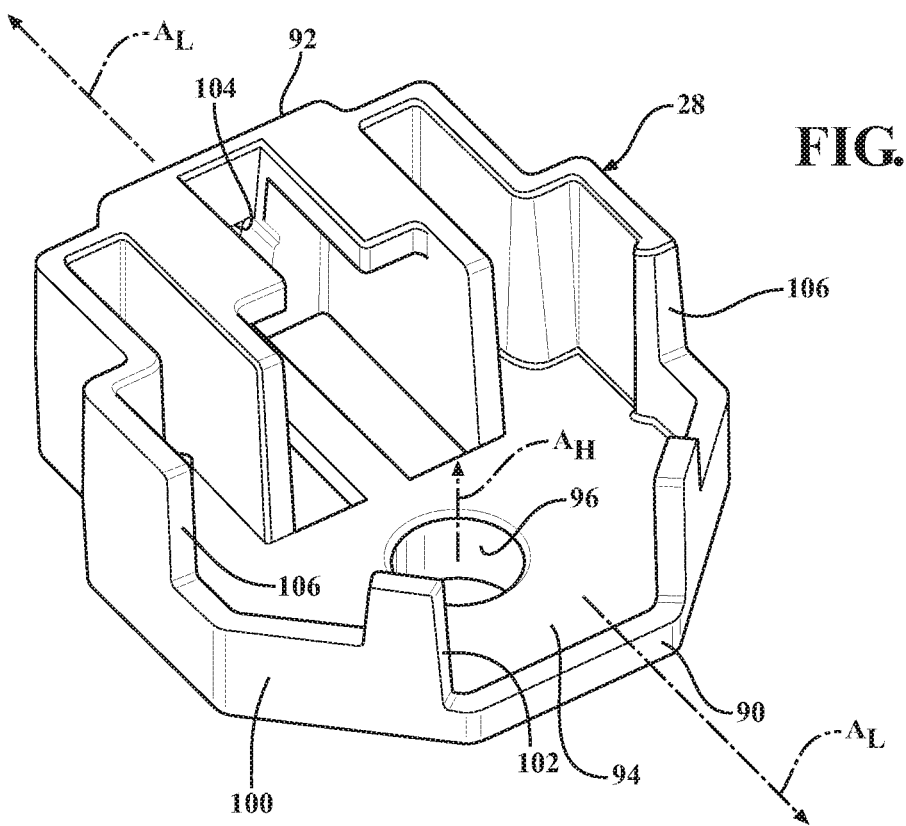
FIG. 5 is a perspective view of an auto-return housing of the lever assembly.

The lever 24 is pivotally mounted to the lever housing 22. In an embodiment, and as shown in FIGS. 2-4, the lever assembly 20 further has first 48 and second 50 support members each coupled to the lever housing 22 and arranged opposite one another. The first support member 48 defines a first socket portion 52, and the second support member 50 defines a second socket portion 54. The first 48 and second 50 support members are arranged such that the first 52 and second 54 socket portions are adjacent and opposite one another to form a whole socket for receiving a pivoting member 56 of the lever 24. Additionally, the support members 48, 50 are arranged adjacent the lever housing 22 such that the whole socket is adjacent the first opening 40 of the lever housing 22.

The pivoting member 56 is fixed or integral with the lever 24 proximate the first lever end 44. The pivoting member 56 is movably seated, received, and/or supported within the socket formed by the first 48 and second 50 support members. The pivot member 56 enables the lever 24 to pivot relative to the lever housing 22. In particular, the lever 24 is pivotable between a rest position and at least one actuated position. The lever 24 is in the rest position when the lever 24 has not been actuated, and the lever 24 is in the at least one actuated position when the lever 24 has been actuated. In an embodiment, the at least one actuated position is further defined as a pair of actuated positions. The lever 24 may be manually actuated, by the vehicle operator or driver, for actuating the turn signal function of the vehicle. This is accomplished by the operator by manually pivoting the lever 24 from the rest position to one of the pair of actuated positions. For example, the operator may pivot the lever 24 from the rest position to one of the actuated positions to actuate a right turn signal, and may pivot the lever 24 from the rest position to the other one of the actuated positions to actuate a left turn signal. Typically, the lever 24 is pivoted upwards to actuate the right turn signal and downwards to actuate the left turn signal. It is to be appreciated that the lever 24 could move inwards and outwards to actuate high beams or another vehicle operational function(s).

In an embodiment, and as shown in FIG. 2, the lever assembly 20 includes a magnet 58 mounted to the lever 24 proximate the first lever end 44 and adjacent the pivoting member 56. The lever assembly 20 further includes a printed circuit board 60 disposed over the lever housing 22 and the second support member 50. The printed circuit board 60 contains electronics including one or more sensors, such as Hall Effect sensor(s), that communicate with a controller. The sensor(s) interact with the magnet 58 to detect a position of the lever 24, such as movement of the lever 24 upwards, downwards, forwards, or backwards.

In an embodiment, the lever assembly 20 includes a sleeve 62 disposed over a portion of the lever 24 including the pivoting member 56 and the magnet 58. In this embodiment, the socket formed by the first 48 and second 50 support members is configured to receive the pivoting member 56 and the magnet 58 disposed within the sleeve 62. In other words, the sleeve 62 is disposed over the pivoting member 56 and the magnet 58, and the pivoting member 56 with the sleeve 62 is disposed within the socket. Additionally, the lever assembly 20 includes a cover 64 disposed over the printed circuit board 60 and mounted to the lever housing 22 by any suitable means, such as with fasteners or the like.

Figure 8:
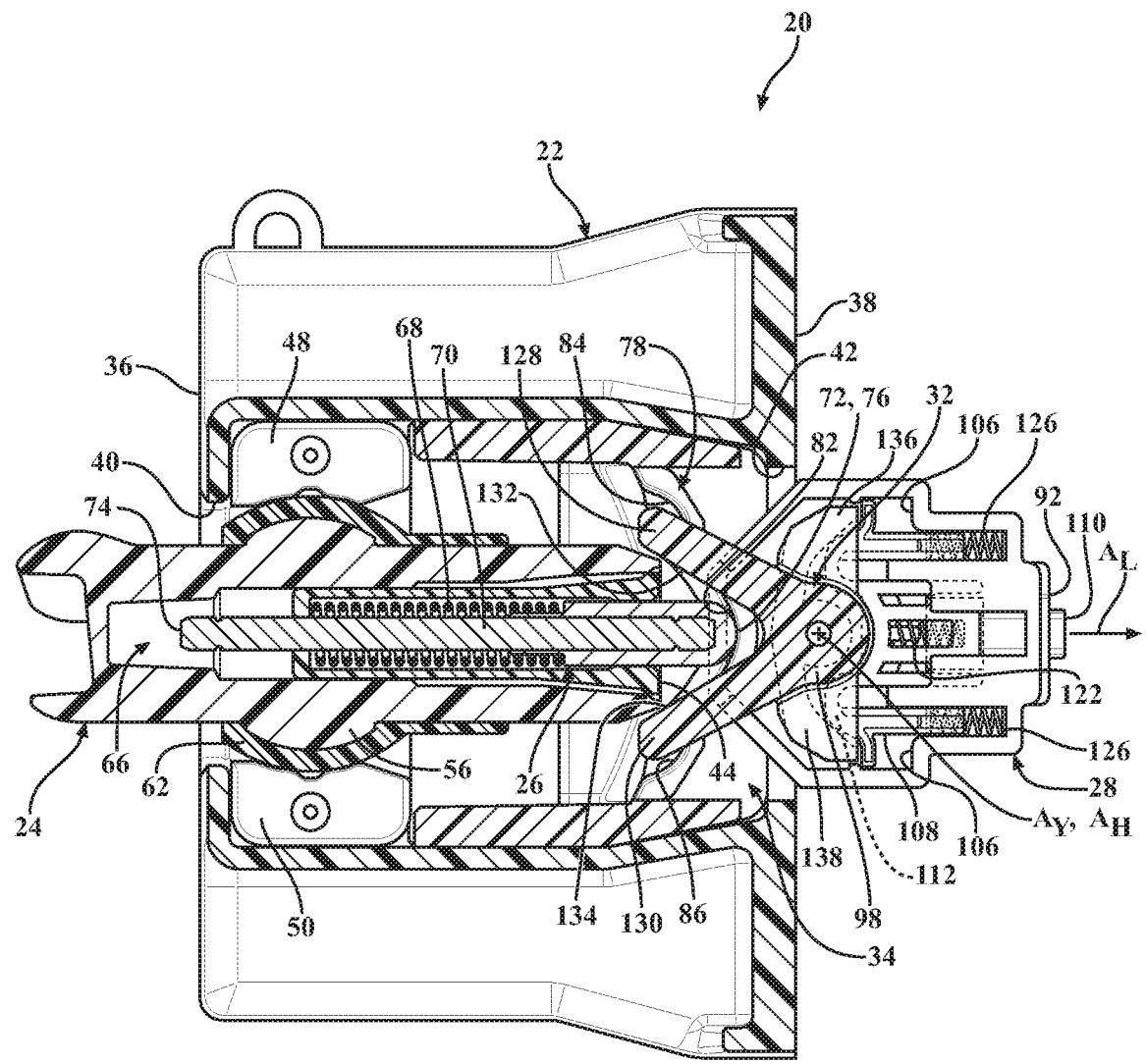
FIG. 8 is a cross-sectional view of a portion of the lever assembly illustrating a lever of the lever assembly in a rest position.

Referring at least to FIG. 8, the lever assembly 20 has the plunger 26 coupled to the lever 24 and pivotable with the lever 24 when the lever 24 moves to the at least one actuated position. The plunger 26 extends into the cavity 34 of the lever housing 22 biased toward the second lever housing end 38. In an embodiment, the lever 24 defines a cavity 66 with the plunger 26 disposed and movable within the cavity 66. The lever assembly 20 further includes a plunger biasing element 68 coupled to the plunger 26 to bias the plunger 26 toward the second lever housing end 38 such that a portion of the plunger 26 protrudes outside of the cavity 66 and extends into the lever housing 22. As shown, the plunger 26 has a plunger body 70, a first plunger end 72, and a second plunger end 74 spaced from the first plunger end 72. The plunger body 70 extends between the first 72 and second 74 plunger ends. The plunger biasing element 68 is coupled to the plunger body 70. The first plunger end 72 is disposed within the cavity 66 and the second plunger end 74 forms a plunger tip 76 that interacts with the yoke member 32 inside the lever housing 22. Interaction of the plunger 26 with the yoke member 32 is described below.

Figure 10:
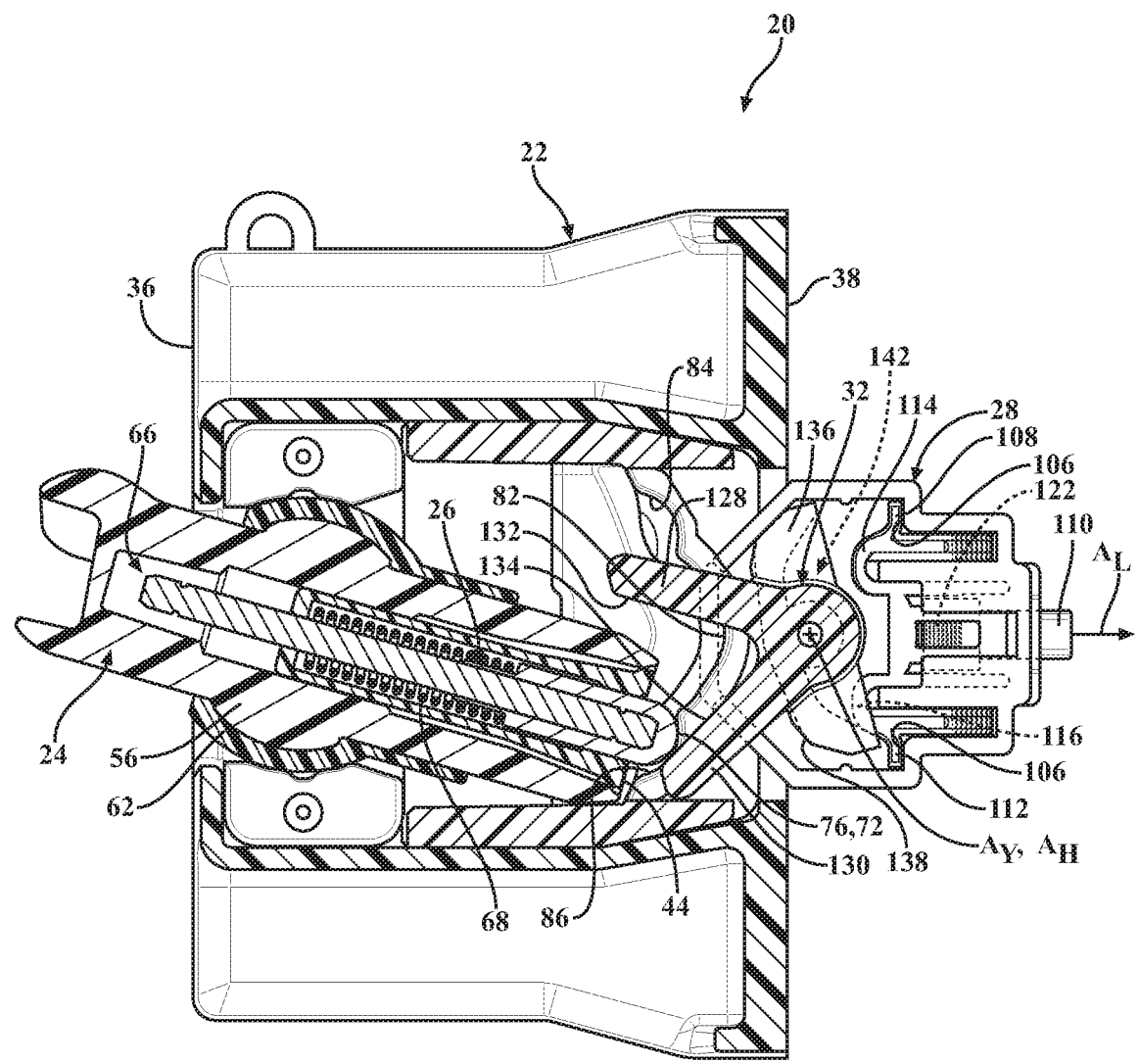
FIG. 10 is a cross-sectional view of a portion of the lever assembly illustrating the lever in an actuated position, a trigger mechanism in an extended position, and an auto-return housing in a home position.

The lever assembly 20 further has the detent plate 78 disposed within the cavity 34 of the lever housing 22 adjacent the plunger 26. The detent plate 78, which may also be referred to as an index track, defines a cavity 80. The plunger 26 is biased outwardly toward the second lever housing end 38 such that at least the plunger tip 76 extends toward the detent plate 78. As shown in FIGS. 8, 10, 12, 14, and 16, the detent plate 78 further defines a first detent 82 and a pair of second detents 84, 86. It is to be appreciated that there may be other detents associated with other functions of the lever 24. The first detent 82 of the detent plate 78 corresponds to the rest position of the lever 24 and the pair of second detents 84, 86 corresponds to the pair of actuated positions of the lever 24. In an embodiment, one of the second detents 84 corresponds to the left turn actuated position of the lever 24, and the other one of the second detents 86 corresponds to the right turn actuated position of the lever 24. The plunger 26 is in the first detent 82 when the lever 24 is in the rest position, as illustrated in FIG. 8. The plunger 26 is in one of the second detents 84, 86 when the lever 24 is in one of the second pair of actuated positions, as illustrated at least in FIG. 10. For example, but not shown, the plunger 26 is in the second detent 84 when the lever 24 is in the actuated position associated with a left turn signal. As shown in FIG. 10, the plunger 26 is in the second detent 86 when the lever 24 is in the actuated position associated with a right turn signal. The detent plate 78 further defines an opening 88 for access to the cavity 80 by the yoke member 32.

The lever assembly 20 further includes the auto-return housing 28. The auto-return housing 28 is pivotally mounted to the lever housing 22. As shown at least in FIGS. 3 and 5, the auto-return housing 28 has first 90 and second 92 auto-return housing ends and a base 94 extending between the first 90 and second 92 auto-return housing ends. The auto-return housing 28 defines a pocket 96 in the base 94. The pocket 96 may have any suitable configuration. In an embodiment, the pocket 96 is configured to receive a central body 98 of the yoke member 32 such that the auto-return housing 28 is seated in and pivotable relative to the yoke member 32.

The auto-return housing 28 further has at least one wall 100 extending transverse to the base 94. The wall 100 defines a first auto-return opening 102 in the first auto-return housing end 90 and a second auto-return opening 104 in the second auto-return housing end 92. The wall 100 of the auto-return housing 28 further defines a stop 106 located between the ends 90, 92. As described below, the trigger mechanism 30 engages the stop 106 when the trigger mechanism 30 moves from a retracted position to an extended position.

Figure 12:
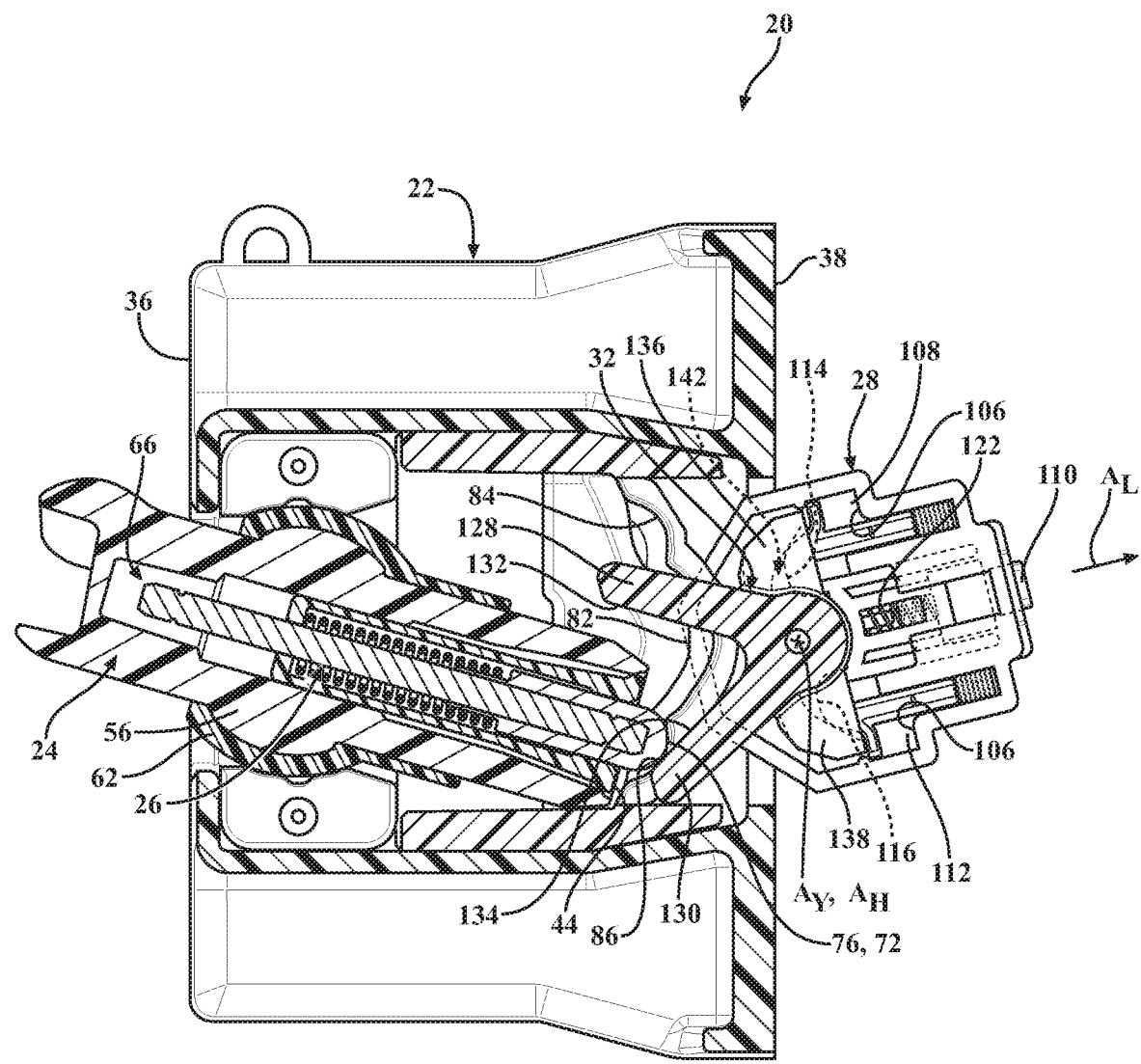
FIG. 12 is a cross-sectional view of a portion of the lever assembly illustrating the lever in the actuated position and the auto-return housing in a pivot position.

The auto-return housing 28 defines a longitudinal axis $A_L$ extending between the first 90 and second 92 auto-return housing ends. The auto-return housing 28 further defines a housing pivot axis $A_H$ transverse to the longitudinal axis $A_L$. The auto-return housing 28 is pivotable about the housing pivot axis $A_H$ relative to the lever housing 22 between a home position and at least one pivot position with the auto-return housing 28 biased toward the home position. In an embodiment, the auto-return housing 28 is pivotable about the housing pivot axis $A_H$ between first and second pivot positions. The auto-return housing 28 is in the home position (such as shown in FIG. 8) when the longitudinal axis $A_L$ is aligned with the lever 24 when the lever 24 is in the rest position and/or is aligned with the first detent 82 of the detent plate 78. The auto-return housing 28 is in the at least one pivot position (such as shown in FIG. 12) when the longitudinal axis $A_L$ is aligned with the lever 24 when the lever 24 is in the at least one actuated position and/or is offset from the first detent 82 of the detent plate 78 in either direction. Further details of the movement of the auto-return housing 28 relative to the lever housing 22 are described below.

Figure 6:
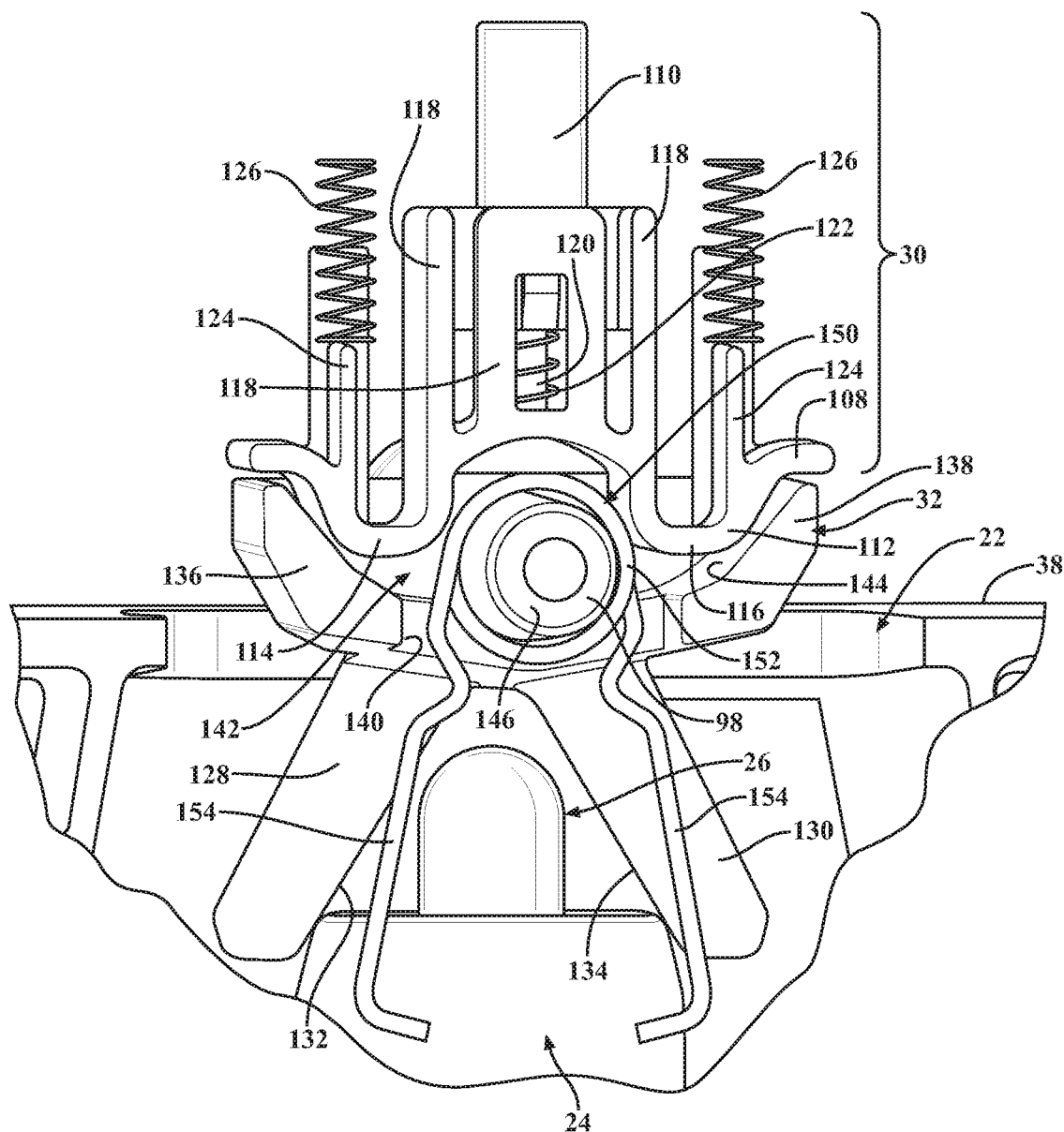
FIG. 6 is a top perspective view of a portion of the lever assembly. Notably, the auto-return housing of the lever assembly has been removed for illustration purposes.

The lever assembly 20 includes the trigger mechanism 30 coupled to and movable relative to the auto-return housing 28 between the retracted position and the extended position mentioned above. As best illustrated in FIG. 6, the trigger mechanism 30 has a guide 108 and a pin 110. The guide 108 is disposed within the auto-return housing 28. The pin 110 is coupled to the guide 108 and at least partially disposed within the auto-return housing 28. In various embodiments, a portion of the pin 110 extends through the second auto-return opening 104 and outside of the auto-return housing 28. The guide 108 has a base 112. As shown, the base 112 has a non-linear configuration. The base 112 defines first 114 and second 116 engaging portions each configured to engage the yoke member 32 as described below. The guide 108 further has a plurality of walls 118 each extending transverse to the base 112 and arranged to receive and align the pin 110.

The guide 108 has a first extension 120 extending from the base 112 and configured to support a first biasing member 122. In an embodiment, the first biasing member 122 is a compression spring. The first biasing member 122 is coupled to the pin 110 and the guide 108 to bias the pin 110 outwardly away from the yoke member 32 and the auto-return housing 28. The pin at least partially extends outside of the auto-return housing 28 when the trigger mechanism 30 is in the extended position for engaging the cam element 12 of the steering column 10 to provide the auto-return of the lever 24 back to the rest position. Additionally, the biasing member 122 biases the pin outwardly away from the yoke member 32 and the auto-return housing 28 when the trigger mechanism 30 is in both of the retracted and extended positions.

It is to be appreciated that the pin 110 moves with the guide 108 when the guide 108 moves outwardly. As mentioned above, the pin 110 is biased outwardly by the first biasing member 122. In this position, the pin 110 protrudes through the second auto-return housing opening 104 toward the steering column 10. The guide 108 also moves relative to the pin 110. For example, the first biasing member 122 compresses to move the pin 110 inwardly relative to the guide 108 when the pin 110 abuts the cam element 12 of the steering column 10.

The guide 108 further has at least one second extension 124 extending from the base 112 and configured to support at least one second biasing member 126. In an embodiment, the second biasing member(s) 124 is a compression spring. In an embodiment, the guide 108 has a pair of second extensions 124 each configured to support a respective one of a pair of the second biasing members 126. The second biasing member(s) 126 is coupled to the guide 108 and the auto-return housing 28 to bias the guide 108 inwardly toward the yoke member 32.

The trigger mechanism 30 moves linearly relative to the auto-return housing 28. In the illustrated embodiments, the trigger mechanism 30 is movable along the longitudinal axis $A_L$ defined by the auto-return housing 28. Additionally, the trigger mechanism 30 is movable between a retracted position (in which the trigger mechanism 30 is spaced from the stop 106, as shown in FIG. 8 for example) and an extended position (in which the trigger mechanism 30 engages the stop 106, as shown in FIG. 10 for example). The second biasing member(s) 126 biases the trigger mechanism 30 toward the retracted position. The trigger mechanism 30 is movable to the extended position in response to pivotal movement of the plunger 26 when the lever 24 pivots to the at least one actuated position for engaging the cam element 12 of the steering column 10 to provide the auto-return of the lever 24 back to the rest position.

In an embodiment, the trigger mechanism 30 is configured to engage the stop 106 of the auto-return housing 28 when the trigger mechanism 30 moves into the extended position in response to the pivotal movement of the yoke member 32. For example, when the yoke member 32 pivots toward an engaged position, the yoke member 32 engages and moves (such as pushes) the trigger mechanism 30 outwardly (along the longitudinal axis $A_L$) toward the extended position. The trigger mechanism 30 is in the extended position when the trigger mechanism 30 (the base of the guide 108) engages the stop 106 defined by the auto-return housing 28. Upon engaging the stop 106, the trigger mechanism 30 cannot move further outwardly.

Figure 7:
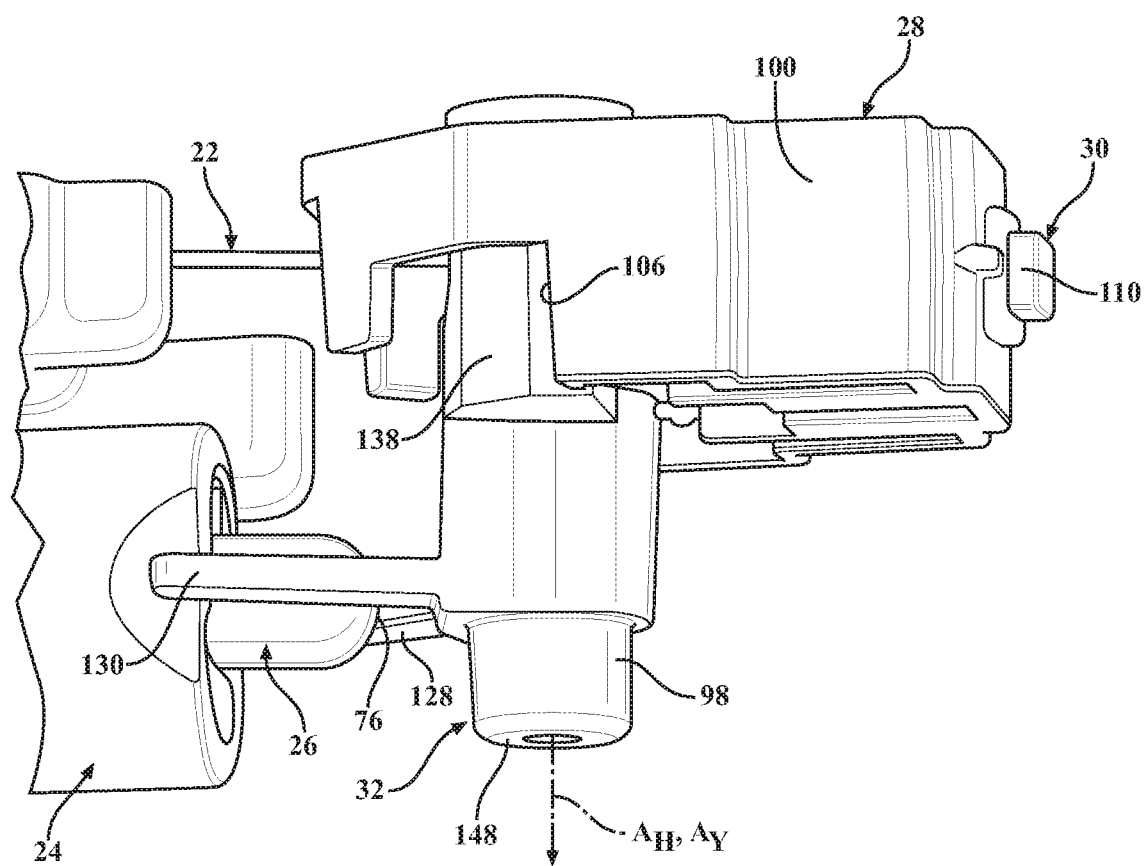
FIG. 7 is a perspective view of a portion of the lever assembly.

The lever assembly 20 further includes the yoke member 32 coupled to the auto-return housing 28 between the trigger mechanism 30 and the plunger 26. The yoke member 32 is pivotable relative to the auto-return housing 28 between a neutral position and the engaged position. The yoke member 32 is configured to interact with the plunger 26 when the plunger 26 pivots with the lever 24 to cause the yoke member 32 to pivot toward the engaged position. Referring at least to FIGS. 6 and 7, the yoke member 32 defines a yoke pivot axis $A_Y$ and has the central body 98. The yoke member 32 further has first 128 and second 130 legs extending from the central body 98 transverse to the yoke pivot axis $A_Y$ toward the lever housing 22. The central body 98, the first leg 128, and the second leg 130 collectively defines a V-shaped configuration of the yoke member 32 in cross-section. Each of the first 128 and second 130 legs has an inner surface 132, 134 configured to interact with the plunger 26 when the plunger 26 pivots with the lever 24 to the at least one actuated position to cause the yoke member 32 to pivot about the yoke pivot axis $A_Y$ toward the engaged position. For example, when the lever 24 is pivoted to the actuated position corresponding to a right turn signal, the plunger 26 contacts and moves along the inner surface 134 of the second leg 130 to cause the yoke member 32 to pivot about the yoke pivot axis $A_Y$ in a counter-clockwise direction towards the engaged position. When the lever 24 is pivoted to the actuated position corresponding to a left turn signal, the plunger 26 contacts and moves along the inner surface 132 of the first leg 128 to cause the yoke member 32 to pivot about the yoke pivot axis $A_Y$ in a clockwise direction towards the engaged position.

Additionally, and by virtue of the V-shaped configuration of the yoke member 32 in cross-section, the first 128 and second 130 legs are about the first detent 82 when the lever 24 is in the rest position. An example of this is shown in FIG. 8. The first 128 and second 130 legs are about one of the second detents 84, 86 when the lever 24 is in a corresponding one of the pair of actuated positions. For example, when the lever 24 is in the actuated position corresponding to a right turn, the first 128 and second 130 legs of the yoke member 32 are about the second detent 86, as shown in FIG. 10.

The yoke member 32 is also configured to interact with the trigger mechanism 30 when the yoke member 32 is pivoted to move the trigger mechanism 30 toward the extended position. As shown at least in FIG. 6, the central body 98 of the yoke member 32 has first 136 and second 138 lobes extending radially outwardly from the yoke pivot axis $A_Y$ in opposing directions. The yoke member 32 defines an opening 140 between the first 136 and second 138 lobes. The first 136 and second 138 lobes collectively define a cradle 142 configured to receive a portion of the trigger mechanism 30 when the yoke member 32 pivots about the yoke pivot axis $A_Y$ toward the engaged position. The first 136 and second 138 lobes further define an engaging surface 144 that interacts with the portion of the trigger mechanism 30 when the yoke member 32 pivots towards the engaged position to effect movement of the trigger mechanism 30 toward the extended position. In an embodiment, the lobes 136, 138 interact with the engaging portions 114, 116 of the guide 108 when the yoke member 32 pivots toward the engaged position to effect movement of the trigger mechanism 30 toward the extended position. For example, when the yoke member 32 pivots counter-clockwise (caused by the plunger 26 which moves with the lever 24 toward the actuated position corresponding to the right turn signal), the second lobe 138 moves toward the second lever housing end 38 and engages the engaging portion 116 of the guide 108 of the trigger mechanism 30. The second lobe 138 pushes the trigger mechanism 30 outwardly toward the second auto-return housing end 92 as the yoke member 32 continues to pivot until the base 112 of the guide 108 engages the stop 106 defined by the auto-return housing 28. Similarly, when the yoke member 32 pivots clockwise (caused by the plunger 26 which moves with the lever 24 toward the actuated position corresponding to the left turn signal), the first lobe 136 moves toward the second lever housing end 38 and engages the engaging portion 114 of the guide 108 of the trigger mechanism 30. The first lobe 136 pushes the trigger mechanism 30 outwardly toward the second auto-return housing end 92 as the yoke member 32 continues to pivot until the base 112 of the guide 108 engages the stop 106 defined by the auto-return housing 28. The yoke member 32 is in the engaged position when the yoke member 32 has completed its pivoting motion and the trigger mechanism 30 has engaged the stop 106 of the auto-return housing 28.

The central body 98 of the yoke member 32 further has first 146 and second 148 body ends, and the auto-return housing 28 defines the pocket 96 with the first body end 146 seated within the pocket 96 such that the yoke member 32 is pivotable relative to the auto-return housing 28. The lever assembly 20 further includes an auto-return biasing member 150 coupled to the auto-return housing 28 to bias the auto-return housing 28 toward the home position. In an embodiment, and as best shown in FIG. 6, the auto-return biasing member 150 is supported by the yoke member 32 and configured to interact with the auto-return housing 28 to bias the auto-return housing 28 toward the home position. For example, the auto-return biasing member 150 is further defined as a helical torsion spring having a head 152 seated on the central body 98 proximate the first body end 146. The head 152 is sandwiched between the auto-return housing 28 and the yoke member 32. The torsion spring further has arms 154 extending through the opening 140 defined between the first 136 and second 138 lobes of the yoke member 32. The arms 154 are configured to interact with the wall 100 of the auto-return housing 28 to bias the auto-return housing 28 toward the home position.

Although the auto-return housing 28 is coupled to the yoke member 32, it should be appreciated that the yoke member 32 and the auto-return housing 28 move independent of one another. In other words, the yoke member 32 is pivotable relative to the auto-return housing 28 between the neutral position and the engaged position independent of the pivoting of the auto-return housing 28 between the home position and the pivot position. For example, and as previously described, the plunger 26 effects the pivotal movement of the yoke member 32 from the neutral position to the engaged position. This pivotal movement of the yoke member 32, however, does not effect or cause pivotal movement of the auto-return housing 28. For example, the auto-return housing 28 is pivotable in any of a plurality of directions when the yoke member 32 pivots in one of the plurality of directions toward the engaged position. In other words, when the yoke member 32 pivots in one direction toward the engaged position, the auto-return housing 28 can pivot in any direction. The independent movement of the auto-return housing 28 will become more evident with the description of a method of operating the lever assembly 20 and the steering column 10 detailed below.

The method of operating the lever assembly 20 and the steering column 10 of the vehicle is described below with reference to FIGS. 8-17. Prior to initiating the method, the lever 24 is in the rest position as shown in FIGS. 8 and 9. With the lever 24 in the rest position, the plunger 26 is in the first detent 82 of the detent plate 78, the yoke member 32 is in the neutral position with the legs 128, 130 of the yoke member 32 about the first detent 82, the trigger mechanism 30 is in the retracted position, and the auto-return housing 28 is in the home position. As best shown in FIG. 9, the steering column 10 is in the central position with the cam element 12 on the left side of the steering column 10 opposite the trigger mechanism 30. With the trigger mechanism 30 in the retracted position, the pin 110 extends outwardly from the second auto-return housing end 104 but is spaced from the cam element 12. This allows rotation of the steering column 10 without any interference between the pin 110 and the cam element 12 when the lever 24 has not been actuated.

Figure 11:
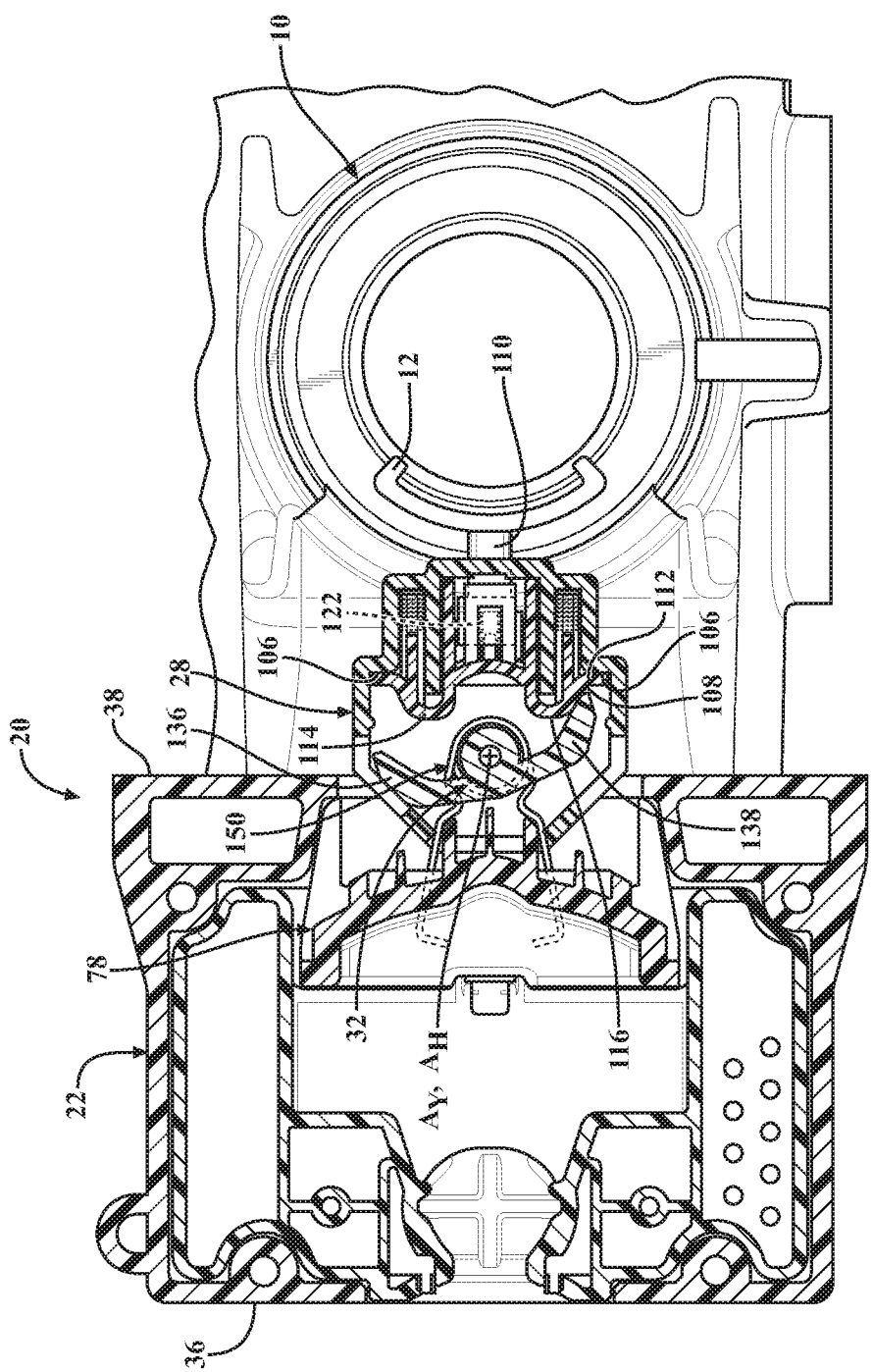
FIG. 11 is a cross-sectional view of the system including the lever assembly and the steering column with the trigger mechanism in the extended position, the auto-return housing in the home position, and the steering column in the central position.

With reference to FIGS. 10 and 11, the method includes the step of pivoting the lever 24 relative to the lever housing 22 from the rest position to the actuated position. The pivoting of the lever 24 is further defined as pivoting the lever 24 relative to the lever housing 22 from the rest position to a selected one of a pair of actuated positions. The lever 24 may be pivoted, for example, by the vehicle operator grasping or touching a portion of the lever 24 exposed within the passenger compartment of the vehicle and moving (such as pushing) the lever 24 toward one of the pair of actuated positions. In instances (such as shown) where the operator moves the lever 24 upwards to one of the actuated positions, a right turn signal of the vehicle actuates. In instances where the operator moves the lever 24 downwards to the other one of the actuated positions, a left turn signal of the vehicle actuates.

The method includes the step of simultaneously pivoting the plunger 26 with the lever 24 to engage the plunger 26 with the yoke member 32. In an embodiment, the step of pivoting the plunger 26 is further defined as pivoting the plunger 26 with the lever 24 to engage the plunger 26 with a corresponding one of the first 128 and second 130 legs of the yoke member 32. For example, upon moving the lever 24 to the actuated position corresponding to a right turn signal (as shown), the plunger tip 76 of the plunger 26 contacts and follows the inner surface 134 of the second leg 130 of the yoke member 32. In doing so, the plunger 26 pushes the second leg 130 of the yoke member 32 outwardly to effect pivotal movement of the yoke member 32 about the yoke pivot axis $A_Y$ in a counter-clockwise direction. This is illustrated in FIGS. 10 and 11. Alternatively, upon moving the lever 24 to the actuated position corresponding to a left turn signal, the plunger tip 76 of the plunger 26 would contact and follow the inner surface 132 of the first leg 128 of the yoke member 32. In doing so, the plunger 26 would push the first leg 128 of the yoke member 32 outwardly to effect pivot movement of the yoke member 32 about the yoke pivot axis $A_Y$ in a clockwise direction.

The method further includes the step of pivoting the engaged yoke member 32 into the engaged position to engage the trigger mechanism 30. In an embodiment, the step of pivoting the engaged yoke member includes the step of receiving a portion of the trigger mechanism 30 in the cradle 142 of the yoke member 32 to engage the trigger mechanism 30. The method further includes the step of moving the engaged trigger mechanism 30 relative to the auto-return housing 28 into an extended position abutting the cam element 12. In an embodiment, the step of moving the engaged trigger mechanism is further defined as moving the engaged trigger mechanism with the one of the first 136 and second 138 lobes that corresponds with the one of the first 128 and second 138 legs of the yoke member 32 engaged by the plunger 26. For example, when a right turn signal is actuated (as shown), the second lobe 138 of the yoke member 32 engages the second engaging portion 116 of the guide 108 of the trigger mechanism 30 to move (such as push) the trigger mechanism 30 outwardly away from the yoke member 32 and into the extended position. This is illustrated in FIGS. 10 and 11. Likewise, when a left turn signal is actuated, the first lobe 136 of the yoke member 32 would engage the first engaging portion 114 of the guide 108 to move (such as push) the trigger mechanism 30 outwardly away from the yoke member 32 and into the extended position.

Still referring to FIGS. 10 and 11, and in an embodiment, the step of moving the engaged trigger mechanism 30 into the extended position includes the step of moving the guide 108 relative to the auto-return housing 28 to a stop position. As used herein, the stop position describes the position of the guide 108 when the guide 108 engages the stop 106 of the auto-return housing 28. Typically, the stop position of the guide 108 corresponds to the extended position of the trigger mechanism 30. The step of moving the engaged trigger mechanism 30 further includes the steps of engaging the cam element 12 of the steering column 10 with the pin 110 during the moving the guide 108 relative to the auto-return housing 28 and retracting the pin 110 inwardly to accommodate the cam element 12 with the guide 108 remaining in the stop position. As previously described, the pin 110 extends outwardly when the trigger mechanism 30 is in the extended position (and the guide 108 is in the stop position). Before the steering column 10 has been rotated, the pin 110 abuts the cam element 12 positioned adjacent the trigger mechanism 30. The first biasing member 122 allows the pin 110 to retract inwardly relative to the guide 108 in order to accommodate the cam element 12 to allow the steering column 10 to rotate freely.

Figure 13:
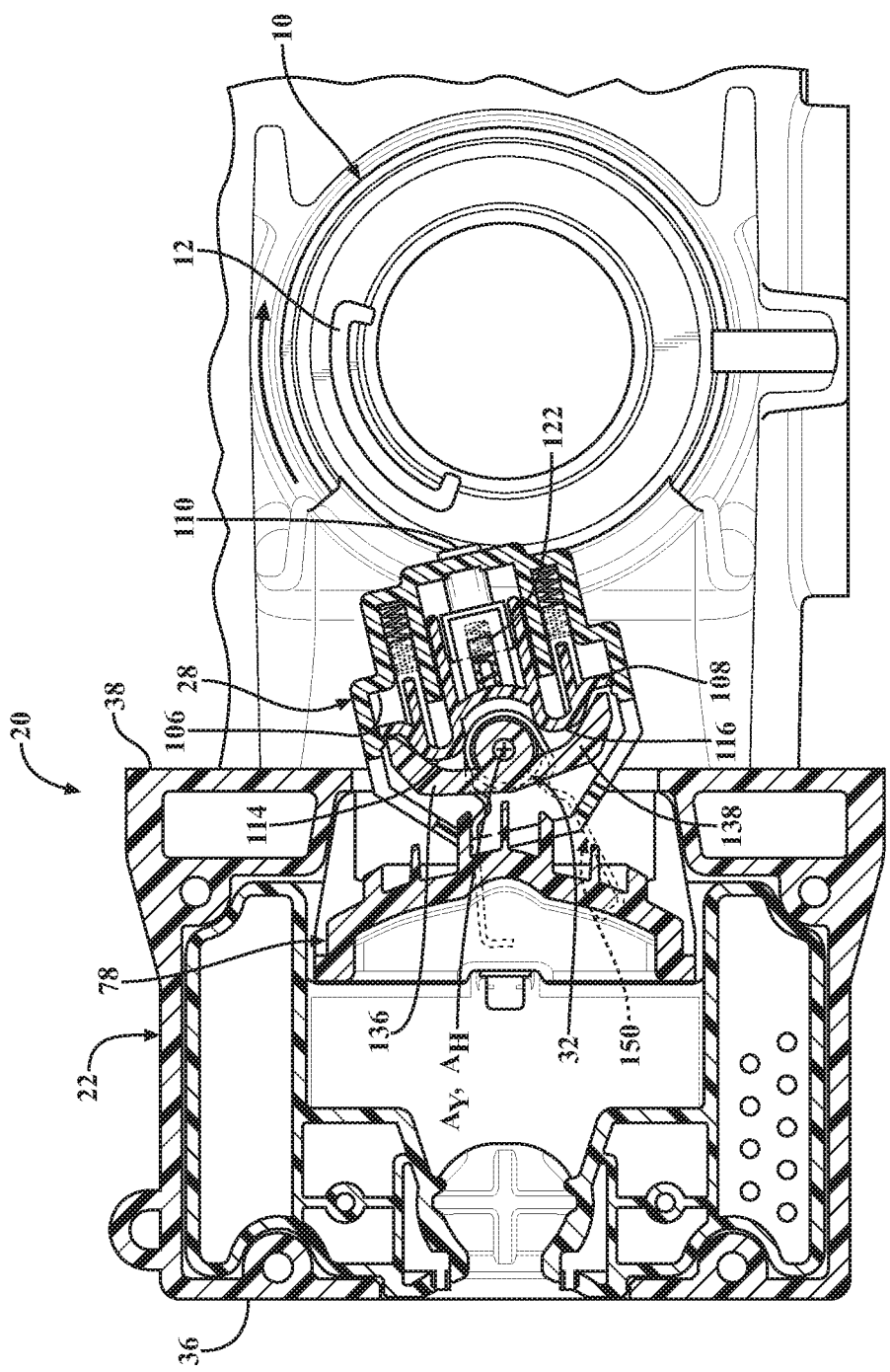
FIG. 13 is a cross-sectional view of the system including the lever assembly and the steering column with the lever in the actuated position, the auto-return housing in a pivot position, and the steering column being rotated in a first direction.

With reference now to FIGS. 12 and 13, the method further includes the step of turning the steering column 10 of the vehicle in a first direction. In the illustrated embodiment, and as shown in FIG. 13, the steering column 10 is turned in a clockwise direction to perform a right turn of the vehicle. The cam element 12, which is mounted to the steering column 10, also turns in the first direction with the steering column 10.

The method further includes the steps of engaging the trigger mechanism 30 with the cam element 12 of the steering column 10 during the step of turning the steering column 10 in the first direction and pivoting the auto-return housing 28 from the home position to a first pivot position during the engagement of the cam element 12 with the trigger mechanism 30, such as shown in FIGS. 12 and 13. With the trigger mechanism 30 in the extended position, the pin 110 of the trigger mechanism 30 in contact with the cam element 12 moves with the cam element 12 as the steering column 10 moves in the first direction. This movement of the pin 110 causes the auto-return housing 28 (which carries the trigger mechanism 30) to pivot from the home position toward the pivot position. When the auto-return housing 28 pivots from the home position to the first pivot position, the trigger mechanism 30 remains engaged with the yoke member 32 and moves away from the stop 106. Since the trigger mechanism 30 remains engaged with the yoke member 32, the pin 110 of the trigger mechanism 30 retracts relative to the auto-return housing 28.

In an embodiment, the method includes the step of biasing the auto-return housing 28 toward the home position utilizing the auto-return biasing member 150. As the cam element 12 and the steering column 10 continue to turn, the cam element 12 disengages from the pin 110 of the trigger mechanism 30. Since the auto-return housing 28, which carries the trigger mechanism 30, is biased toward the home position, the auto-return housing 28 automatically returns to the home position once the pin 110 disengages from the cam element 12. This is shown in FIGS. 14 and 15.

Figure 14:
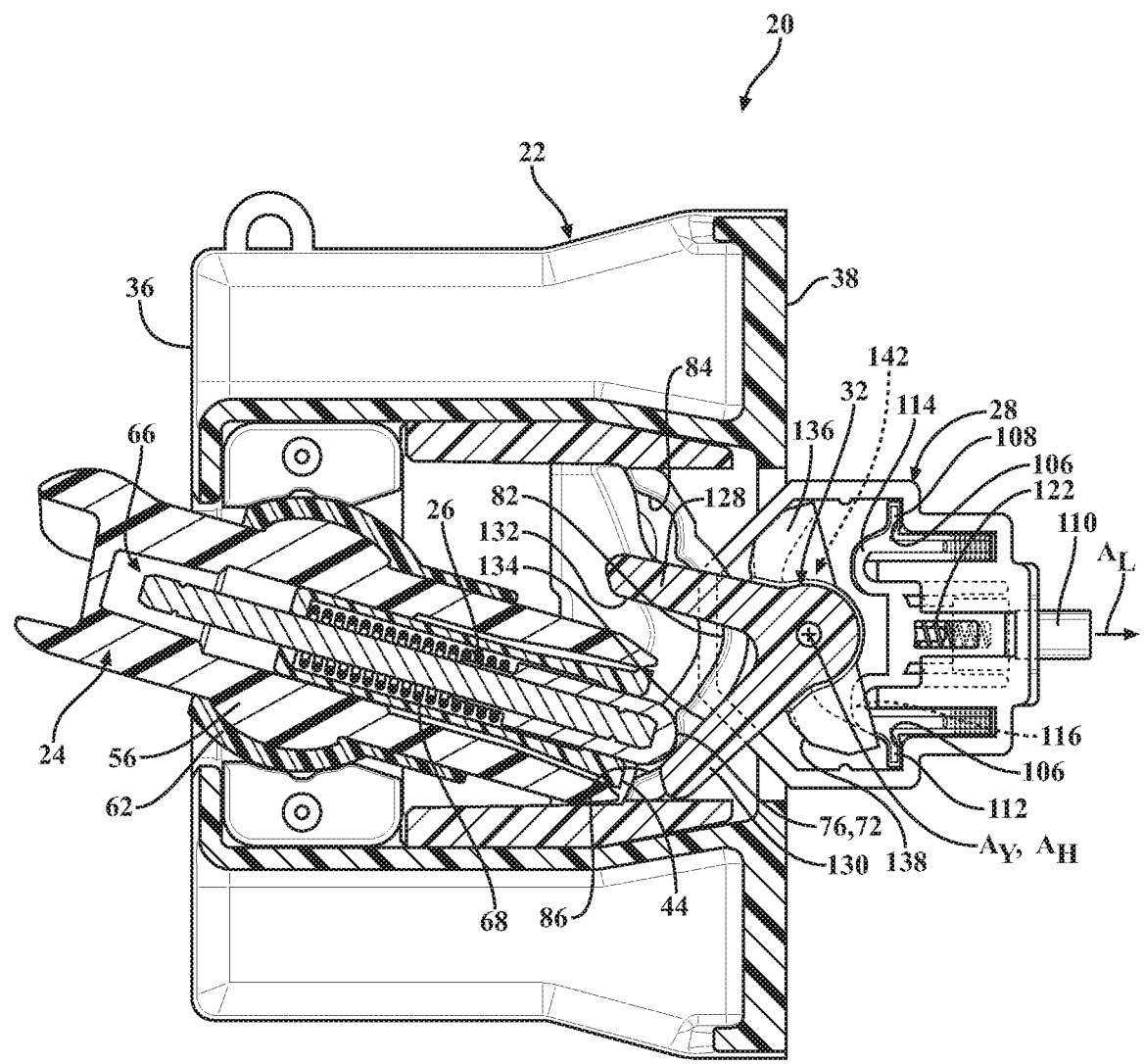
FIG. 14 is a cross-sectional view of a portion of the lever assembly illustrating lever in the actuated position and the auto-return housing pivoting back the home position.
Figure 15:
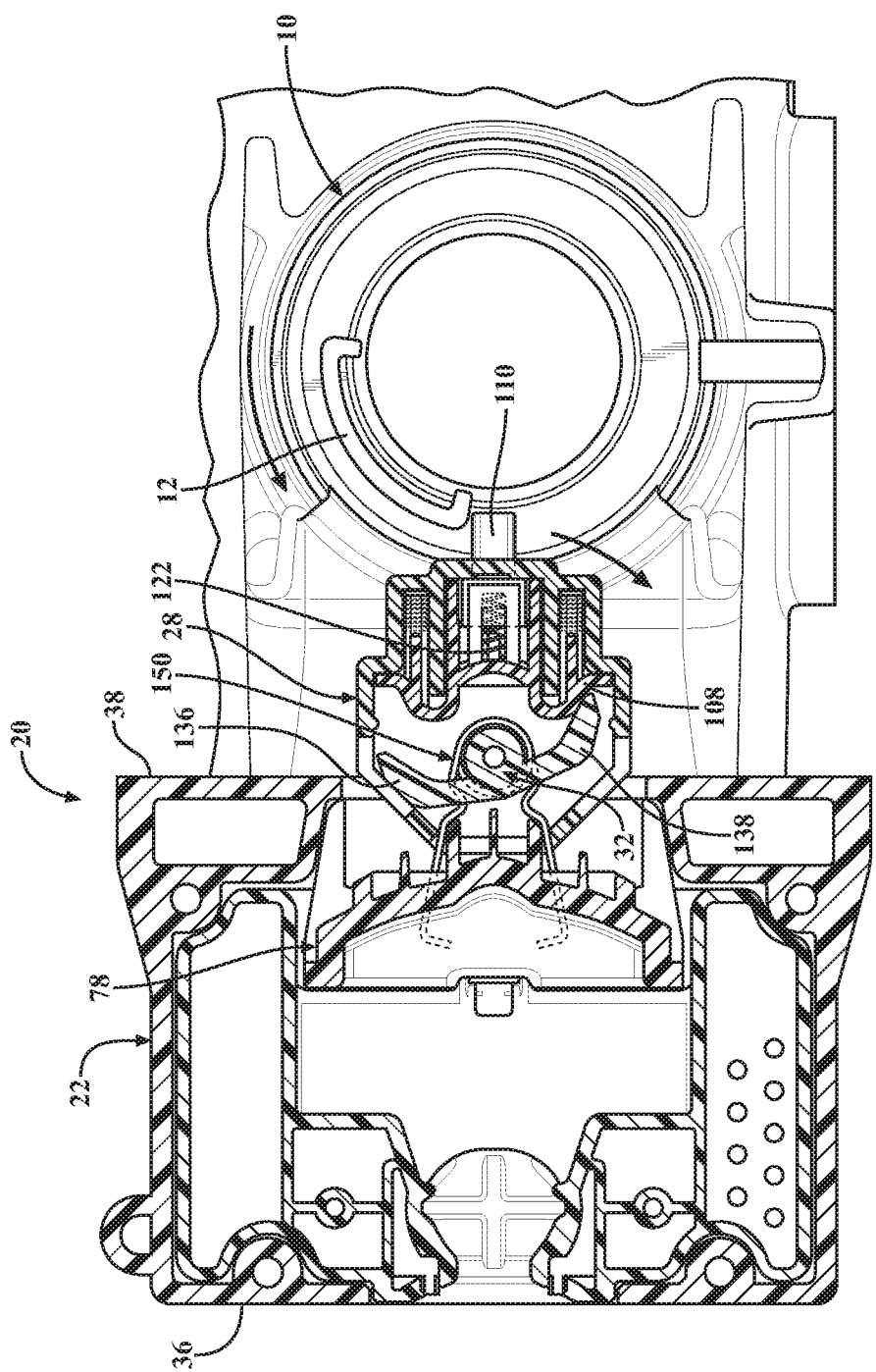
FIG. 15 is a cross-sectional view of the system including the lever assembly and the steering column with the steering column rotating in a second direction opposite the first direction and the auto-return housing pivoting from the first pivot position to the home position.
Figure 16:
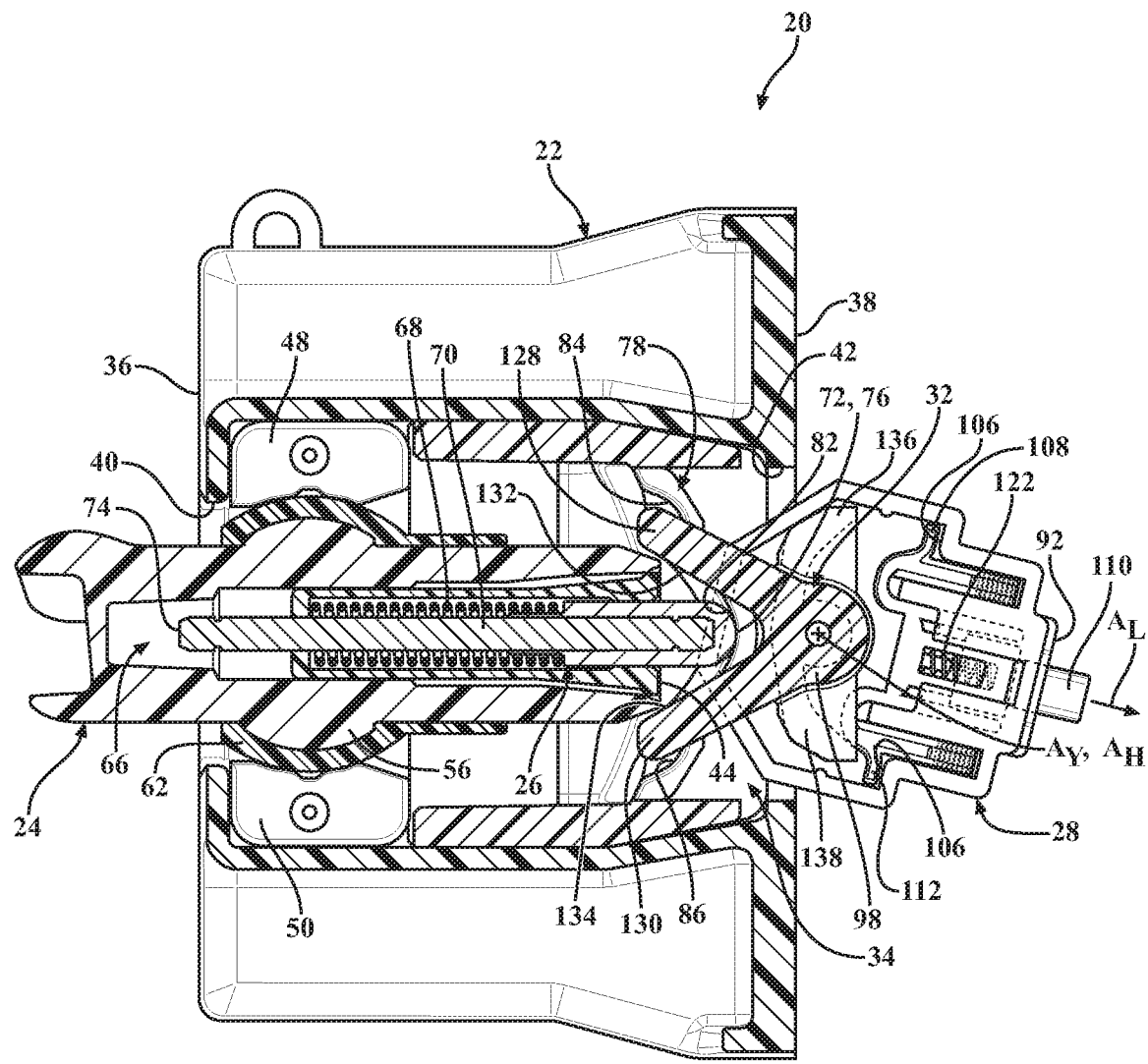
FIG. 16 is a cross-sectional view of a portion of the lever assembly illustrating the auto-return housing pivoting toward a second pivot position to provide an auto-return of the lever back to the rest position.
Figure 17:
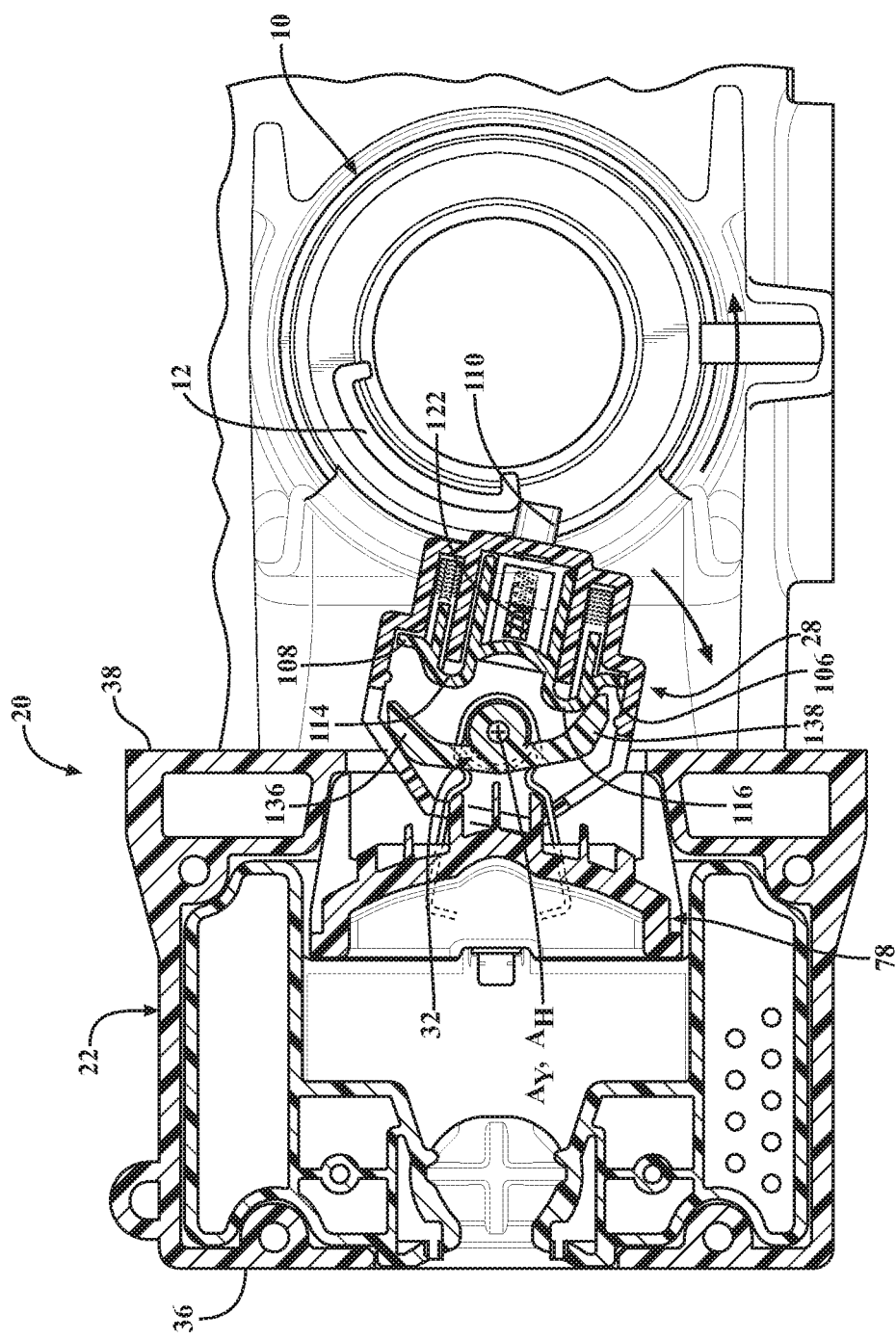
FIG. 17 is a cross-sectional view of the system including the lever assembly and the steering column with the steering column rotating in the second direction opposite the first direction and the auto-return housing pivoting toward the second pivot position.

With reference to FIGS. 14-17, the method further includes the steps of turning the steering column 10 in a second direction opposite the first direction. The trigger mechanism 30 will be captured with the cam element 12 during the step of turning the steering column 10 in the second direction, such as shown in FIGS. 14 and 15. The auto-return housing 28 will then be pivoted from the home position to a second pivot position during the capturing of the trigger mechanism 30. Then, the method includes the step of automatically returning the lever 24 back to the rest position, as shown in FIGS. 16 and 17. For example, once the right turn has been completed, the vehicle operator rotates the steering wheel (and therefore the steering column 10) in the counter-clockwise direction (which is opposite the first direction) back to the central position. As the steering column 10 turns in the counter-clockwise direction, the cam element 12 captures or catches the pin 110 of the trigger mechanism 30, which has automatically returned to the home position. The pin 110 abuts the cam element 12 as the auto-return housing 28 pivots from the home position to the second pivot position.

As described above, for a right turn, the auto-return housing 28 moves in a counter-clockwise direction relative to the home position into the first pivot position, and moves in a clockwise direction relative to the home position into the second pivot position. It is to be appreciated that the first and second pivot positions of the auto-return housing 28 are reversed for a left turn. For example, for a left turn, the auto-return housing 28 moves in a clockwise direction relative to the home position into the first pivot position, and moves into a counter-clockwise direction relative to the home position into the second pivot position.

Automatic return of the lever 24 back to the rest position is actuated when the auto-return housing 28 reaches the second pivot position, as shown in FIGS. 16 and 17. In an embodiment, the step of automatically returning the lever 24 back to the rest position includes the steps of pivoting the yoke member 32 from the engaged position to the neutral position during the pivoting of the auto-return housing 28 from the home position to the second pivot position and simultaneously pivoting the plunger 26 with the lever 24 back to the rest position. The method further includes the step of moving the auto-return housing 28 to the home position after the step of automatically returning the lever 24 back to the rest position, which returns the system back to the positions shown in FIGS. 8 and 9. Specifically, when the auto-return housing 28 pivots to the second pivot position, the trigger mechanism 30 and/or the auto-return housing 28 (both of which are in direct contact with the yoke member 32) pushes the yoke member 32 to initiate pivotal movement of the yoke member 32 in a direction toward the neutral position. The yoke member 32 (which is in direct contact with the plunger 26) then pushes the plunger 26 out of the second detent 84, 86 and causes the lever 24, which carries the plunger 26, to automatically move (or snap) back to the rest position. Notably, when the yoke member 32 pushes the plunger 26 out of the second detent 84, 86 and moves back to the neutral position, the trigger mechanism 30 is no longer pressed toward the stop 106 of the auto-return housing 28 and moves back toward the retracted position. Once in the retracted position, the pin 110 no longer interferes with the cam element 12, which allows the auto-return housing 28 to move to the home position.

It should be appreciated that the pivoting steps of the auto-return housing 28 are performed independent of the step of pivoting of the engaged yoke member 32. As previously described, the auto-return biasing member 150 operates to bias the auto-return housing 28 toward the home position. While the auto-return biasing member 150 is supported on the central body 98 of the yoke member 32, the auto-return biasing member 150 does not bias the yoke member 32 toward the neutral position. Rather, the yoke member 32 returns to the neutral position (once pivoted toward the engaged position) by movement of 1) the auto-return housing 28 to the second pivot position, and then 2) pivotal movement of the plunger 26 back to the rest position. As described above, the movement of the auto-return housing 28 from the home position to the pivot position is caused by interaction of the trigger mechanism 30 (the pin 110) with the cam element 12 as the steering column 10 is turned. This movement is independent of the movement of the yoke member 32.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A lever assembly for a steering column of a vehicle with the steering column having a cam element, said lever assembly comprising:
   a lever housing defining a cavity and having first and second lever housing ends;
   a lever pivotally mounted to said lever housing and pivotable between a rest position and at least one actuated position with said lever extending from said first lever housing end;
   a plunger coupled to said lever and pivotable with said lever when said lever moves to said at least one actuated position with said plunger extending into said cavity biased toward said second lever housing end;
   an auto-return housing pivotally mounted to said lever housing and having first and second auto-return housing ends with said auto-return housing pivotable relative to said lever housing between a home position and at least one pivot position with said auto-return housing biased toward said home position;
   a trigger mechanism coupled to and movable relative to said auto-return housing between a retracted position and an extended position with said trigger mechanism biased toward said retracted position and movable to said extended position in response to said pivotal movement of said plunger when said lever pivots to said at least one actuated position for engaging the cam element of the steering column to provide an auto-return of said lever back to said rest position; and
   a yoke member coupled to said auto-return housing between said trigger mechanism and said plunger and pivotable relative to said auto-return housing between a neutral position and an engaged position independent of said pivoting of said auto-return housing between said home position and said pivot position, with said yoke member configured to interact with said plunger when said plunger pivots with said lever to cause said yoke member to pivot toward said engaged position and said yoke member is configured to interact with said trigger mechanism when said yoke member is pivoted to move said trigger mechanism toward said extended position.

2. The lever assembly as set forth in claim 1 wherein said auto-return housing is pivotable in any one of a plurality of directions when said yoke member pivots in one of said plurality of directions towards said engaged position.

3. The lever assembly as set forth in claim 1 further comprising an auto-return biasing member coupled to said auto-return housing to bias said auto-return housing toward said home position.

4. The lever assembly as set forth in claim 1 wherein said auto-return housing defines a housing pivot axis and said yoke member defines a yoke pivot axis with said housing pivot axis aligned with said yoke pivot axis.

5. The lever assembly as set forth in claim 1 further comprising an auto-return biasing member supported by said yoke member and configured to interact with said auto-return housing to bias said auto-return housing toward said home position.

6. The lever assembly as set forth in claim 1 wherein said yoke member defines a yoke pivot axis and has a central body and first and second legs extending from said central body transverse to said yoke pivot axis toward said lever housing with said central body, said first leg, and said second leg collectively defining a V-shaped configuration of said yoke member in cross-section, and each of said first and second legs having an inner surface configured to interact with said plunger when said plunger pivots with said lever to said at least one actuated position to cause said yoke member to pivot about said yoke pivot axis toward said engaged position.

7. The lever assembly as set forth in claim 1 wherein said yoke member defines a yoke pivot axis and has a central body and first and second lobes extending radially outwardly from said yoke pivot axis in opposing directions with said first and second lobes collectively defining a cradle configured to receive a portion of said trigger mechanism when said yoke member pivots about said yoke pivot axis toward said engaged position.

8. The lever assembly as set forth in claim 7 wherein said first and second lobes further define an engaging surface that interacts with said portion of said trigger mechanism when said yoke member pivots towards said engaged position to effect movement of said trigger mechanism toward said extended position.

9. The lever assembly as set forth in claim 1 wherein said yoke member has a central body having opposing first and second ends and said auto-return housing defines a pocket with said first end of said central body seated within said pocket such that said yoke member is pivotable relative to said auto-return housing.

10. The lever assembly as set forth in claim 1 wherein said auto-return housing defines a stop and said trigger mechanism is configured to engage said stop when said trigger mechanism moves into said extended position in response to said pivotal movement of said yoke member.

11. The lever assembly as set forth in claim 1 wherein said trigger mechanism has a guide disposed within said auto-return housing and a pin coupled to said guide and at least partially extending outside of said auto-return housing when said trigger mechanism is in said extended position for engaging the cam element of the steering column to provide the auto-return of said lever back to said rest position.

12. The lever assembly as set forth in claim 11 further comprising a first biasing member coupled to said pin and said guide to bias said pin outwardly away from said yoke member and said auto-return housing when said trigger mechanism is in both of said retracted and extended positions.

13. The lever assembly as set forth in claim 11 further comprising at least one second biasing member coupled to said guide and said auto-return housing to bias said guide inwardly toward said yoke member.

14. The lever assembly as set forth in claim 1 wherein said lever defines an opening with said plunger disposed and movable within said opening and further comprising a plunger biasing element coupled to said plunger to bias said plunger toward said second lever housing end such that a portion of said plunger protrudes outside of said opening and extends into said lever housing.

15. The lever assembly as set forth in claim 1 wherein said at least one actuated position is further defined as a pair of actuated positions and further comprising a detent plate disposed within said cavity of said lever housing adjacent said plunger with said detent plate defining a first detent and a pair of second detents with said plunger in said first detent when said lever is in said rest position and said plunger in one of said second detents when said lever is in one of said pair of actuated positions; and wherein said yoke member has a central body and first and second legs extending from said central body with said first and second legs about said first detent when said lever is in said rest position and said first and second legs about one of said second detents when said lever is in a corresponding one of said pair of actuated positions.

16. A method of operating a lever assembly and a steering column of a vehicle with the steering column having a cam element, and the lever assembly comprising a lever housing having first and second lever housing ends, a lever, a plunger coupled to the lever, an auto-return housing, a trigger mechanism coupled to the auto-return housing, and a yoke member coupled to the auto-return housing between the trigger mechanism and the plunger, with said method comprising the steps of:

pivoting the lever relative to the lever housing from a rest position to an actuated position;

simultaneously pivoting the plunger with the lever to engage the plunger with the yoke member;

pivoting the engaged yoke member into an engaged position to engage the trigger mechanism;

moving the engaged trigger mechanism relative to the auto-return housing into an extended position abutting the cam element;

turning the steering column of the vehicle in a first direction;

engaging the trigger mechanism with the cam element of the steering column during the step of turning the steering column in the first direction;

pivoting the auto-return housing from a home position to a first pivot position during the engagement of the cam element with the trigger mechanism;

turning the steering column in a second direction opposite the first direction;

capturing the trigger mechanism with the cam element during the step of turning the steering column in the second direction;

pivoting the auto-return housing to a second pivot position during the capturing of the trigger mechanism; and automatically returning the lever back to the rest position.

17. The method as set forth in claim 16 wherein the step of automatically returning the lever back to the rest position includes the steps of:

pivoting the yoke member from the engaged position to a neutral position during the pivoting of the auto-return housing from the home position to the second pivot position; and simultaneously pivoting the plunger with the lever back to the rest position.

18. The method as set forth in claim 16 further comprising the step of pivoting the auto-return housing back to the home position after the pivoting of the auto-return housing to the first pivot position during the engagement of the cam element with the trigger and before the turning of the steering column in the second direction.

19. The method as set forth in claim 18 further comprising the step of pivoting the auto-return housing from the home position to the second position after the step of pivoting the auto-return housing back to the home position.

20. The method as set forth in claim 16 further comprising the step of moving the auto-return housing from the second pivot position to the home position after the step of automatically returning the lever back to the rest position.

21. The method as set forth in claim 16 wherein the trigger mechanism has a guide disposed within the auto-return housing, a pin coupled to the guide, and a first biasing member coupled to the guide and the pin to bias the pin outwardly away from the yoke member and the step of moving the engaged trigger mechanism includes the steps of:

moving the guide relative to the auto-return housing to a stop position;

engaging the cam element of the steering column with the pin during the moving of the guide relative to the auto-return housing; and retracting the pin inwardly to accommodate the cam element with the guide remaining in the stop position.

22. The method as set forth in claim 16 wherein each of the pivoting of the auto-return housing steps is performed independent of the step of pivoting the engaged yoke member.

23. The method as set forth in claim 16 wherein the lever assembly further comprises an auto-return biasing member supported by the yoke member and coupled to the auto-return housing and further comprising the step of biasing the auto-return housing toward the home position utilizing the auto-return biasing member.

24. The method as set forth in claim 16 wherein the actuated position of the lever is one of a pair of actuated positions and the yoke member has a central body and first and second legs extending from the central body with the central body, the first leg, and the second leg collectively defining a V-shaped configuration of the yoke member in cross-section,
- wherein the step of pivoting the lever is further defined as pivoting the lever relative to the lever housing from the rest position to a selected one of the pair of actuated positions, and
- wherein the step of pivoting the plunger is further defined as pivoting the plunger with the lever to engage the plunger with a corresponding one of the first and second legs of the yoke member.

25. The method as set forth in claim 24 wherein the yoke member defines a pivot axis and has a first lobe corresponding to the first leg and a second lobe corresponding to the second leg with the first and second lobes collectively defining a cradle,
- wherein the step of pivoting the engaged yoke member includes the step of receiving a portion of the trigger mechanism in the cradle of the yoke member to engage the trigger mechanism with the yoke member, and
- wherein the step of moving the engaged trigger mechanism is further defined as moving the engaged trigger mechanism with the one of the first and second lobes that corresponds with the one of the first and second legs of the yoke member engaged by the plunger.

* * * * *